United States Patent
Caire et al.

(10) Patent No.: US 8,229,443 B2
(45) Date of Patent: *Jul. 24, 2012

(54) METHOD OF COMBINED USER AND COORDINATION PATTERN SCHEDULING OVER VARYING ANTENNA AND BASE-STATION COORDINATION PATTERNS IN A MULTI-CELL ENVIRONMENT

(75) Inventors: Giuseppe Caire, South Pasadena, CA (US); Sean A. Ramprashad, Los Altos, CA (US); Haralabos Papadopoulos, San Jose, CA (US)

(73) Assignee: NTT DoCoMo, Inc., Tokyo (JP)

( * ) Notice: Subject to any disclaimer, the term of this patent is extended or adjusted under 35 U.S.C. 154(b) by 312 days.

This patent is subject to a terminal disclaimer.

(21) Appl. No.: 12/538,733

(22) Filed: Aug. 10, 2009

(65) Prior Publication Data

US 2010/0041407 A1 Feb. 18, 2010

Related U.S. Application Data

(60) Provisional application No. 61/088,712, filed on Aug. 13, 2008.

(51) Int. Cl.
*H04W 40/00* (2009.01)
(52) U.S. Cl. ..................... 455/446
(58) Field of Classification Search .......... 455/446, 455/522, 561, 450, 226.1, 226.2, 296, 501, 455/45, 436, 447, 448, 453, 464, 505, 463, 455/449, 62, 553.1; 370/329, 331, 468, 470, 370/522, 253, 330, 445, 335
See application file for complete search history.

(56) References Cited

U.S. PATENT DOCUMENTS 5,903,842 A 5/1999 Wang et al.
5,982,327 A 11/1999 Vook et al.
(Continued)

FOREIGN PATENT DOCUMENTS

EP 1162750 A2 12/2001
(Continued)

OTHER PUBLICATIONS

US Office Action for U.S. Appl. No. 12/209,110 dated Feb. 11, 2011, 20 pages.
(Continued)

*Primary Examiner* — Melody Mehrpour
(74) *Attorney, Agent, or Firm* — Blakely Sokoloff Taylor & Zafman LLP

(57) ABSTRACT

A method and system is disclosed herein for scheduling in a multi-cell environment. In one embodiment, the system comprises a plurality of user terminals; a plurality of base stations to communicate with the plurality of user terminals, wherein the plurality of antennas from the base stations are grouped into coordination patterns that specify which antennas operate together as a cluster to coordinate transmissions with a subset of the plurality of user terminals, and further wherein defined pairs of the antenna sets and associated user sets vary over transmission resources based on coordination pattern changes such that different sets of antennas in the plurality of antennas are grouped together on different resources to coordinate transmissions to different subsets of users; and at least one controller to execute at least one scheduling algorithm to schedule transmissions with user terminals by specifying which user terminal to schedule for service by which sets of antennas and on which transmission resource and with what transmission rate.

26 Claims, 12 Drawing Sheets

Cells of the same color (shading) coordinate transmissions

U.S. PATENT DOCUMENTS

| | | | |
|---|---|---|---|
| 6,629,287 B1 | 9/2003 | Brink | |
| 6,804,307 B1 | 10/2004 | Popovic | |
| 6,862,552 B2 | 3/2005 | Goldstein et al. | |
| 6,901,117 B1 | 5/2005 | Classon et al. | |
| 7,042,858 B1 | 5/2006 | Ma et al. | |
| 7,072,295 B1 | 7/2006 | Benson et al. | |
| 7,095,812 B2 | 8/2006 | Chan et al. | |
| 7,251,768 B2 | 7/2007 | Giannakis et al. | |
| 7,308,047 B2 | 12/2007 | Sadowsky | |
| 7,310,369 B1 | 12/2007 | Krieger et al. | |
| 7,436,895 B1 | 10/2008 | Tujkovic | |
| 7,441,045 B2 | 10/2008 | Skene et al. | |
| 7,443,925 B2 | 10/2008 | Mehta et al. | |
| 7,564,915 B2 | 7/2009 | Lee et al. | |
| 7,620,117 B2 | 11/2009 | Chae et al. | |
| 7,877,097 B2 * | 1/2011 | Zhu et al. | 455/446 |
| 7,877,108 B2 * | 1/2011 | Wengerter et al. | 455/522 |
| 2002/0114404 A1 | 8/2002 | Aizawa et al. | |
| 2002/0176431 A1 | 11/2002 | Golla et al. | |
| 2003/0236080 A1 | 12/2003 | Kadous et al. | |
| 2004/0022179 A1 | 2/2004 | Giannakis et al. | |
| 2004/0116146 A1 | 6/2004 | Sadowsky et al. | |
| 2004/0165675 A1 | 8/2004 | Ito et al. | |
| 2004/0205445 A1 | 10/2004 | Xu | |
| 2005/0010675 A1 | 1/2005 | Jaggi et al. | |
| 2005/0041751 A1 | 2/2005 | Nir et al. | |
| 2005/0047514 A1 | 3/2005 | Bolinth et al. | |
| 2005/0068918 A1 | 3/2005 | Mantravadi et al. | |
| 2005/0111592 A1 | 5/2005 | Yee | |
| 2005/0152391 A1 | 7/2005 | Effros et al. | |
| 2005/0185707 A1 | 8/2005 | Hoo et al. | |
| 2005/0265280 A1 | 12/2005 | Roh et al. | |
| 2006/0002312 A1 | 1/2006 | Delattre et al. | |
| 2006/0020560 A1 | 1/2006 | Rodriguez et al. | |
| 2006/0029124 A1 | 2/2006 | Grant et al. | |
| 2006/0098760 A1 | 5/2006 | Shen et al. | |
| 2006/0146716 A1 | 7/2006 | Lun et al. | |
| 2006/0146791 A1 | 7/2006 | Deb et al. | |
| 2006/0148506 A1 | 7/2006 | Hoo | |
| 2006/0176945 A1 | 8/2006 | Li | |
| 2007/0041475 A1 | 2/2007 | Koshy et al. | |
| 2007/0066229 A1 | 3/2007 | Zhang et al. | |
| 2007/0198899 A1 | 8/2007 | Yellin et al. | |
| 2007/0281633 A1 | 12/2007 | Papadopoulos | |
| 2007/0286313 A1 | 12/2007 | Nikopour-Deilami et al. | |
| 2008/0025430 A1 | 1/2008 | Sadowsky | |
| 2008/0032630 A1 * | 2/2008 | Kim et al. | 455/45 |
| 2008/0075022 A1 | 3/2008 | Lei et al. | |
| 2008/0092028 A1 | 4/2008 | Orio | |
| 2008/0101310 A1 | 5/2008 | Marzetta | |
| 2008/0123781 A1 | 5/2008 | Pisek et al. | |
| 2008/0181339 A1 | 7/2008 | Chen et al. | |
| 2008/0212526 A1 * | 9/2008 | Oyman | 370/329 |
| 2009/0082054 A1 | 3/2009 | Li et al. | |
| 2009/0213954 A1 | 8/2009 | Bursalioglu et al. | |
| 2009/0225878 A1 | 9/2009 | Papadopoulos et al. | |
| 2009/0285323 A1 | 11/2009 | Sundberg et al. | |
| 2009/0291699 A1 * | 11/2009 | Heath et al. | 455/501 |
| 2009/0296842 A1 | 12/2009 | Papadopoulos et al. | |

FOREIGN PATENT DOCUMENTS

| | | |
|---|---|---|
| EP | 1383246 A2 | 1/2004 |
| EP | 1411693 A2 | 4/2004 |
| EP | 1521386 A2 | 4/2005 |
| EP | 1530387 A1 | 5/2005 |
| EP | 1648097 A | 4/2006 |
| EP | 1648097 A2 | 4/2006 |
| EP | 1827040 A1 | 8/2007 |
| EP | 1863208 A1 | 12/2007 |
| GB | 2304495 | 3/1997 |
| GB | 2407007 A | 4/2005 |
| KR | 1020060063478 A | 6/2006 |
| WO | WO 01/43293 A1 | 6/2001 |
| WO | WO 2004/045167 A | 5/2004 |
| WO | WO 2004/025011 A1 | 7/2004 |
| WO | WO 2005/046081 A1 | 5/2005 |
| WO | WO 2006/029050 A | 3/2006 |
| WO | WO 2007/050860 A1 | 5/2007 |
| WO | WO 2007/073267 A1 | 6/2007 |
| WO | WO 2004/056011 A1 | 7/2007 |
| WO | WO 2007/087540 A2 | 8/2007 |
| WO | WO 2007/129990 A1 | 11/2007 |
| WO | WO 2008/057791 A1 | 5/2008 |
| WO | WO 2008/143973 A1 | 11/2008 |
| WO | WO 2009/033023 A2 | 3/2009 |
| WO | WO 2010/019618 A2 | 2/2010 |

OTHER PUBLICATIONS

US Office Action for U.S. Appl. No. 12/121,649, Apr. 19, 2011, 25 pgs.

US Office Action for U.S. Appl. No. 12/130,821, Feb. 22, 2011, 12 pgs.

US Office Action for U.S. Appl. No. 12/121,634, Mar. 1, 2011, 19 pgs.

US Office Action for U.S. Appl. No. 11/644,638, Apr. 15, 2011, 7 pgs.

European Office Action for European Patent Application No. 09718026.9, Feb. 10, 2011, 3 pgs.

European Office Action for European Patent Application No. 08756664.2, Mar. 17, 2011, 6 pgs.

US Final Office Action for U.S. Appl. No. 11/644,638, dated Apr. 29, 2010, 22 pages.

Korean Office Action for corresponding Korean Patent Application No. 2008-7023249, dated May 27, 2010, 4 Pgs.

European Office Action for corresponding European Patent Application No. 07862325.3, dated Jul. 6, 2010, 6 pgs.

PCT International Search Report for PCT Patent Application No. PCT/US2009/053472, dated Jun. 14, 2010, 7 pgs.

Written Opinion of the International Searching Authority for PCT Patent Application No. PCT/US2009/053472, dated Jun. 14, 2010, 5 pgs.

US Final Office Action for U.S. Appl. No. 12/040,653, dated Jun. 15, 2010, 40 pages.

US Final Office Action for U.S. Appl. No. 11/873,248, dated Sep. 1, 2010, 21 pages.

US Office Action for U.S. Appl. No. 11/939,353 dated Jan. 31, 2011, 15 pages.

Sen, et al., "Cute and jCUTE Concolic Unit Testing and Explicit Path Model-Checking Tool", Computer Aided Verification Lecture Notes in Computer Science, Jan. 1, 2006, pp. 419-423.

Majumdar, et al., "Hybrid Concolic Testing", IEEE 29th International Conference on Software Engineering, May 1, 2007, pp. 416-426.

PCT International Preliminary Report on Patentability for PCT Patent Application No. PCT/US2009/046014, dated Dec. 16, 2010, 9 pages.

PCT International Search Report for PCT Patent Application No. PCT/US2010/033549, Jan. 5, 2011, 5 pgs.

PCT Written Opinion of the International Searching Authority for PCT Patent Application No. PCT/US2010/033549, Jan. 5, 2011, 6 pgs.

European Office Action for European Patent Application No. 08767750.6, dated Jan. 12, 2011, 6 pgs.

PCT International Search Report for PCT Patent Application No. PCT/US2010/027139, Dec. 6, 2010, 5 pgs.

PCT Written Opinion of the International Searching Authority for PCT Patent Application No. PCT/US2010/027139, Dec. 6, 2011, 6 pgs.

European Office Action for European Patent Application No. 08767751.4, Jan. 14, 2011, 5 pgs.

Papadogiannis, et al., "A Dynamic Clustering Approach in Wireless Networks with Multi-Cell Cooperative Processing", IEEE International Conference on Communications, May 19, 2008, pp. 4033-4037.

PCT International Preliminary Report on Patentability for PCT Patent Application No. PCT/US2009/053466, dated Feb. 24, 2011, 9 pages.

PCT International Preliminary Report on Patentability for PCT Patent Application No. PCT/US2009/053471, dated Feb. 24, 2011, 9 pages.

PCT International Preliminary Report on Patentability for PCT Patent Application No. PCT/US2009/054937, dated Mar. 10, 2011, 8 pages.
PCT International Preliminary Report on Patentability for PCT Patent Application No. PCT/US2009/056865, dated Mar. 24, 2011, 12 pgs.
European Office Action for European Patent Application No. 07862325.3, Apr. 7, 2011, 6 pgs.
Papadogiannis, Agisilaos, et al., "A Dynamic Clustering Approach in Wireless Networks with Multi-Cell Cooperative Processing", IEEE International Conference on Communications, May 19, 2008, pp. 4033-4037, Piscataway, NJ, USA.
Karakayali, M., et al., "Network Coordination for Spectrally Efficient Communications in Cellular Systems", IEEE Wireless Communications, Aug. 1, 2006, pp. 56-61, vol. 13, No. 4, IEEE Service Center, Piscataway, NJ, USA.
Etri, "Coordinated multi-cell transmission for LTE Advanced downlink", 3GPP TSG RAN WG1 Meeting #54, Aug. 12, 2008, pp. 1-4, Jeju, South Korea.
Samsung, "Inter-Cell Interference Mitigation Through Limited Coordination", 3GPP TSG RAN WG1 Meeting #54, Aug. 12, 2008, 9 pages, Jeju, South Korea.
PCT International Search Report for PCT Patent Application No. PCT/US2009/053466, dated Nov. 18, 2009, 6 pages.
PCT Written Opinion of the International Searching Authority for PCT Patent Application No. PCT/US2009/053466, dated Nov. 18, 2009, 9 pages.
Karakayali, M., et al., "On the Maximum Common Rate Achievable in a Coordinated Network", Mar. 3, 2006, 6 pages.
Caire, G., et al., "Multiuser MIMO Downlink with Limited Inter-Cell Cooperation: Approximate Interference Alignment in Time, Frequency, and Space", 8 pages.
Boccardi, F., et al., "Limited Downlink Network Coordination in Cellular Networks", The 18th Annual IEEE International Symposium on Personal, Indoor, and Mobile Radio Communications (PIMRC '07), 5 pages.
Caire, G., et al., "Multiuser MIMO Achievable Rates with Downlink Training and Channel State Feedback", 31 pages.
Caire, G., et al., "On the Achievable Throughput of a Multiantenna Gaussian Broadcast Channel", IEEE Transactions on Information Theory, vol. 49, No. 7, Jul. 2003, pp. 1691-1706.
Marzetta, T., "How Much Training Is Required for Multiuser MIMO?", 5 pages.
Taoka, H., et al., "Field Experiments in Ultimate Frequency Efficiency Exceeding 30 bit/Second/Hz Using MLD Signal Detection in MIMO-OFDM Broadband Packet Radio Access", 6 pages.
PCT International Search Report dated Sep. 18, 2008, for PCT/US08/006286, filed May 16, 2008, 4 pages.
Written Opinion of the International Searching Authority dated Sep. 18, 2008, for PCT/US08/006286, filed May 16, 2008, 8 pages.
International Search Report mailed Nov. 6, 2008 for PCT/US08/065675, filed Jun. 3, 2008, 5 pages.
Written Opinion of the International Searching Authority mailed Nov. 6, 2008 for PCT/US08/065675, filed Jun. 3, 2008, 8 pages.
International Search Report for related application WO 08/048651, dated Jun. 25, 2008.
Written Opinion of the International Searching Authority for related application WO 08/048651, dated Jun. 25, 2008.
Communication Relating to the Results of the Partial International Search dated Jan. 31, 2009 for PCT/US07/13074, filed Jun. 1, 2007.
PCT International Search Report dated Apr. 14, 2008 for PCT/US07/23207, 3 pages.
Written Opinion of the International Searching Authority dated Apr. 14, 2008 for PCT/US07/23207, 6 pages.
International Search Report dated Apr. 15, 2008 for PCT/US07/24572, 4 pages.
Written Opinion of the International Searching Authority dated Apr. 15, 2008 for PCT/US07/24572, 6 pages.
PCT International Search Report dated Aug. 20, 2008 for PCT/US08/03274, 4 pages.
Written Opinion of the International Searching Authority dated Aug. 20, 2008 for PCT/US08/03274, 10 pages.

International Search Report dated Apr. 17, 2009 for PCT/US2008/076252, 5 pages.
Written Opinion of the International Searching Authority dated Apr. 17, 2008 for PCT/US2008/076252, 9 pages.
Written Opinion of the International Searching Authority dated Apr. 30, 2009 for PCT/US2007/022189, 8 pages.
PCT International Search Report for PCT Patent Application No. PCT/US2009/035735, dated Jul. 13, 2009, 5 pages.
Written Opinion of the International Searching Authority for PCT Patent Application No. PCT/US2009/035735, dated Jul. 13, 2009, 8 pages.
PCT International Preliminary Report on Patentability for PCT Patent Application No. PCT/US2008/003274, dated Sep. 24, 2009, 10 pages.
PCT International Search Report for PCT Patent Application No. PCT/US2007/013074, dated Dec. 2, 2009, 8 pgs.
Written Opinion of the International Searching Authority for PCT Patent Application No. PCT/US2007/013074, dated Dec. 2, 2009, 8 pgs.
PCT International Search Report for PCT Patent Application No. PCT/US2009/046014, dated Nov. 27, 2009, 7 pgs.
Written Opinion of the International Searching Authority for PCT Patent Application No. PCT/US2009/046014, dated Nov. 27, 2009, 8 pgs.
PCT International Preliminary Report on Patentability for PCT Patent Application No. PCT/US2007/013074, dated Dec. 30, 2009, 8 pages.
PCT International Search Report for PCT Patent Application No. PCT/US2008/006287, dated Oct. 2, 2008, 6 pgs.
Written Opinion of the International Searching Authority for PCT Patent Application No. PCT/US2008/006287, dated Oct. 2, 2008, 7 pgs.
PCT International Preliminary Report on Patentability for PCT Patent Application No. PCT/US2008/065675, dated Dec. 17, 2009, 8 pages.
PCT International Search Report for PCT Patent Application No. PCT/US2009/054937, dated Dec. 30, 2009, 7 pgs.
Written Opinion of the International Searching Authority for PCT Patent Application No. PCT/US2009/054937, dated Dec. 30, 2009, 7 pgs.
PCT International Search Report for PCT Patent Application No. PCT/US2009/56865, dated Mar. 2, 2010, 7 pgs.
Written Opinion of the International Searching Authority for PCT Patent Application No. PCT/US2009/56865, dated Mar. 2, 2010, 12 pgs.
PCT International Search Report for PCT Patent Application No. PCT/US2009/034758, dated Feb. 4, 2010, 7 pgs.
Written Opinion of the International Searching Authority for PCT Patent Application No. PCT/US2009/034758, dated Feb. 4, 2010, 7 pgs.
US Office Action for U.S. Appl. No. 12/040,653, dated Dec. 11, 2009, 33 pages.
US Office Action for U.S. Appl. No. 11/644,638, dated Sep. 22, 2009, 13 pages.
US Office Action for U.S. Appl. No. 11/754,903, dated Mar. 29, 2010, 11 pages.
US Office Action for U.S Appl. No. 11/873,248, dated Mar. 31, 2010, 18 pages.
Lattice Semiconductor Corp., "Turbo Decoder", IP Data Sheet, 2003, 6 pages.
Kao, Chien-Yu, "A Bi-directional SOVA with Normalization for Turbo Decoding", Jun. 2006, Tainan, Taiwan, 72 pages.
Chindapol, Aik, et al., "Design, Analysis, and Performance Evaluation for BICM-ID with Square QAM Constellations in Rayleigh Fading Channels", IEEE Journal on Selected Areas in Communications, vol. 19, No. 5, May 2001, pp. 944-957.
Alamouti, Siavash M., "A Simple Transmit Diversity Technique for Wireless Communications", IEEE Journal on Select Areas in Communications, vol. 16, No. 8, Oct. 1998, pp. 1451-1458.
Cox, Richard V., et al., "Subband Speech Coding and Matched Convolutional Channel Coding for Mobile Radio Channels", IEEE Transactions on Signal Processing, vol. 39, No. 8, Aug. 1991, pp. 1717-1731.

Hagenauer, Joachim, et al., "The Performance of Rate-Compatible Punctured Convolutional Codes for Digital Mobile Radio", IEEE Transactions on Communications, vol. 38, No. 7, Jul. 1990, pp. 966-980.

Lee, Inkyu, et al., "Space-Time Bit-Interleaved Coded Modulation for OFDM Systems", IEEE Transactions on Signal Processing, vol. 52, No. 3, Mar. 2004, pp. 820-825.

Lee, Heunchul, et al., "A Flexible Space-Time Coding System with Unequal Error Protection", IEEE, 2005, 5 pages.

Lee, Inkyu, et al., "Reduced-Complexity Receiver Structures for Space-Time Bit-Interleaved Coded Modulation Systems", IEEE Transactions on Communications, vol. 55, No. 1, Jan. 2007, pp. 142-150.

Lee, Inkyu, et al., "Code Construction for Space-Time Bit-Interleaved Coded Modulation Systems", IEEE Communications Society, 2004, 5 pages.

Li, Xiaodong, et al., "Bit-Interleaved Coded Modulation with Iterative Decoding and 8PSK Signaling", IEEE Transactions on Communications, vol. 50, No. 8, Aug. 2002, pp. 1250-1257.

Lee, Inkyu, et al., "Code Design of Space-Time Bit-Interleaved Coded Modulation Systems for Maximum Diversity", ICC, Jun. 2004, 11 pages.

Taddei, Herve, et al., Mode Adaptive Unequal Error Protection for Transform Predictive Speech and Audio Coders, IEEE, 2002, pp. 165-168.

Higuchi, K., et al., "Adaptive Selection of Surviving Symbol Replica Candidates ased on Maximum Reliability in QRM_MLD for OFCDM MIMO Multiplexing", in Proc. Globecom, Dec. 2004, pp. 2480-2486.

Wong, K., "The Soft-Output M-Algorithm and Its Applications", PhD Thesis, Queens University, Kingston, Canada, Aug. 2006, 263 pages.

Noh, Y., et al., "Design of Unequal Error Protection for MIMO-OFDM Systems with Heirarchical Signal Constellations", Journal of Communications and Networks, vol. 9, No. 2, Jun. 2007, pp. 167-176.

Seshadri, N., et al., "List Viterbi Decoding Algorithms with Applications", IEEE Transactions on Communications, vol. 42, No. 2/3/4, Feb./Mar./Apr. 1994, pp. 313-323.

Taoka, H., et al., "Field Experiments on Ultimate Frequency Efficiency Exceeding 30 Bit/Second/Hz Using MLD Signal Direction in MIMO-OFDM Broadband Packet Radio Access", Proceedings of IEEE Conference on Vehicular Technology, Apr. 2007, pp. 2129-2134.

Kawai, H., et al., "Independent adaptive control of surviving symbol replica candidates at each stage based on minimum branch metric in QRM-MLD for OFCDM MIMO multiplexing", IEEE Vehicular Techonology Conference, VTC2004, vol. 3, Sep. 2004, pp. 1558-1564.

Wong, K.K.Y., et al., "Low-complexity space-time turbo equalizer with the soft-output M-algorithm for frequency-selective channels", IEEE International Conference on Communications, vol. 4, May 2005, pp. 2251-2255.

Wong, K.K.Y., et al., "Bi-directional soft-output m-algorithm for iterative decoding", IEEE International Conference on Communications, vol. 2, Jun. 2004, pp. 792-797.

Kitty, K.Y. Wong, et al., "Soft-Output Trellis/Tree Iterative Decoder for high-order BICM on MIMO Frequency Selective Rayleigh Fading Channels", IEEE International Conference on Communications, Jun. 2006, pp. 4278-4284.

Papadopoulos, H., et al., "Wideband space-time coded systems with non-collocated antennas", Radio and Wireless Symposium, 2008 IEEE, Jan. 22, 2008, pp. 307-310.

Lee, Inkyu, et al., "Diversity Analysis for Space-Time, Bit-Interleaved Coded Modulation Systems", Korea University, Seoul, Korea, Jan. 2007.

Gencata, et al., "Virtual-topology adaptation for WDM mesh networks under dynamic traffic," Proceedings of IEEE Infocom 2002, vol. 1, Jun. 23, 2002, pp. 48-56.

Koetter, R., et al., "Beyond routing: an algebraic approach to network coding," Proceedings of IEEE Infocom 2002, vol. 1, Jun. 2002, pp. 122-130.

Del Re, Enrico, et al., "Next-Generation Mobile Satellite Networks," IEEE Communications Magazine, vol. 40, No. 9, Sep. 1, 2002, pp. 150-159.

Ernest, P.H.H., et al., "An efficient algorithm for virtual topology reconfiguration in WDM optical ring networks," Proceedings of 10th Conference on Computer Communications and Networks, Oct. 15, 2001, pp. 55-60.

Fasolo, E., "Network coding techniques," www.cs.virginia.edu/{yw5s/Network%20coding.ppt, Mar. 7, 2004, pp. 1-14.

Chou, P.A., et al., "Network Coding for the Internet and Wireless Networks", www.eecs.umich.edu/systems/ChouSeminar.ppt, Mar. 28, 2006, pp. 1-29.

Ahlswede, R., et al., "Network Information Flow", IEEE Transactions on Information Theory, IT-46(4), Jul. 2000, pp. 1204-1216.

Ho, T., et al., "The Benefits of Coding Over Routing in a Randomized Setting", in the Proceedings of the International Symposium on Information Theory (ISIT), Jun. 2003, pp. 1-6.

Katti, S., et al., "XORs in the Air: Practical Wireless Network Coding", in the Proceedings of the ACM Special Interest Group on Data Communication (SIGCOMM), Sep. 2006, 12 pages.

Koetter, R., et al., "An Algebraic Approach to Network Coding", IEEE/ACM Transactions on Networking, vol. 11, No. 5, Oct. 2003, pp. 782-795.

Li, S. R., et al., "Linear Network Coding", IEEE Transactions on Information Theory, IT-49(2), Feb. 2003, pp. 371-381.

Chou, P.A., et al., "Practical Network Coding", 51st Allerton Conference on Communication, Control and Computing, Oct. 2003, 10 pages.

Cormen, T.H., et al., "Introduction to Algorithms", 2nd Edition, MIT Press and McGraw-Hill, 2001, pp. 643-700.

Jafarkani, H., "Space-Time Coding, Theory and Practice", Cambridge University Press, 2005.

Yiu, S., et al., "Distributed Space-Time Block Coding", IEEE Globecom 2005 Proceedings, Nov. 2005.

Su, W., et al., "Signal Constellations for Quasi-Orthogonal Space-Time Block Codes with Full Diversity", IEEE Transactions on Information Theory, Oct. 2004, pp. 2231-2347.

Jafarkani, H., "A Quasi-Orthogonal Space-Time Block Code", IEEE Transactions on Communications, Jan. 2001, 4 pages.

Tirkkonen, O. et al.: "Minimal Non-Orthogonality Rate 1 Space-Time Block Code for 3+ Transmit Antennas," IEEE 6th Int. Symp. Spread Spectrum Tech. and Appl., pp. 429-432, Sep. 2000, 4 pages.

Sharma, N. et al.: "Improved Quasi-Orthogonal Codes Through Constellation Rotation," IEEE Trans. Communications, pp. 332-335, Mar. 2003, 3 pages.

Wang, H. et al.: "Upper Bounds of Rates of Space-Time Block Codes from Complex Orthogonal Designs," IEEE Trans. Information Theory, pp. 2788-2796, Oct. 2003, 9 pages.

El Gamal, H. et al., "Distributed Space-Time Filtering for Cooperative Wireless Networks", GLOBECOM'03, Dec. 2003, pp. 1826-1830.

Sezgin, A., et al., "On EXIT-Chart Analysis of Coherent and Non-Coherent Space-Time Codes", Smart Antennas, 2004, pp. 49-56.

Horn, R.A., et al., "Matrix Analysis", Cambridge University Press, New York, 1994.

Tse, D., et al., "Fundamentals of Wireless Communication", Cambridge University Press, May 2005.

Stott, J.H., "The DVB Terrestrial (DVB-T) Specification and Its Implementation in a Practical Modem", Proceedings of the 1996 International Broadcasting Convention, IEEE Conference Publication No. 428, Sep. 1996, pp. 255-260.

Guerin, R., et al., "Quality-of-Service in Packet Networks: Basic Mechanisms and Directions", Invited Paper, Computer Networks, vol. 31, No. 3, Feb. 1999, pp. 1-16.

Zhang, H., "Service Disciplines for Guaranteed Performance Service in Packet-Switching Networks", in the Proceedings of the IEEE, vol. 83, No. 10, Oct. 1995, pp. 1-23.

Caire, G., et al., "Achievable Throughput of MIMO Downlink Beamforming and Limited Channel Information", Proceedings of IEEE PIMRC, Aug. 2007.

Medard, M., "The Effect upon Channel Capacity in Wireless Communication of Imperfect Knowledge of the Channel", IEEE Transactions on Information Theory, May 2000, pp. 935-945.

Marzetta, T.L., "How Much Training Is Required for Multi-User MIMO?", ACSSC96, Asilomar Conference Oct. 2006.
Viswanath, P., et al., "Sum Capacity of the Multiple Antenna Gaussian Broadcast Channel and Uplink-Downlink Duality", IEEE Transactions on Information Theory, Aug. 2003, pp. 1912-1923.
Peel, C.B., et al., "A Vector Pertrubation Technique for Near-Capacity Multi Antenna Multi User Communication, Part I: Channel Inversion and Regularization", IEEE Transactions on Communications, Jan. 2005, pp. 195-202.
Joham, M., et al., "Linear Transmit Processing in MIMO Communications Systems", IEEE Transactions on Signal Processing, Aug. 2005, pp. 2700-2712.
Osseiran, A., The Winner II Air Interface: Refined Spatial-Temporal Processing Solutions, Online Citation <https://www.ist.-winner.org/WINNER2-Deliverables/D3.4.1.pdf>, Jan. 1, 2007, pp. 1-148.
Bandemer, B., et al., "Linear MMSE Multi-User MIMO Downlink Precoding for Users with Multiple Antennas", IEEE International Symposium on Personal, Indoor and Mobile Communications, Sep. 1, 2006, pp. 1-5.
Catt, "Non-codebook based pre-coding for E-UTRA TDD Downlink", 3rd Generation Partnership Project, Oct. 4, 2006, pp. 1-3.
Gomadam, K.S., et al., "Techniques for Multi-user MIMO with Two-way Training", IEEE International Conference on Communications, May 19, 2008, pp. 3360-3366.
Michalke, Clemens, et al., "Linear MOMO Receivers vs. Tree Search Detection: A Performance Comparison Overview", IEEE Internatinal Symposium on Personal, Indoor and Mobile Radio Communications, Sep. 11, 2006, pp. 1-7.
Narayanan, K.R., et al., "Low Complexity Turbo Equalization with Binary Coding", IEEE International Conference on Communications, ICC '2000, New Orleans, pp. 1-5, vol. 1.
Hoeher, Peter, "Advances in Soft-Output Decoding", IEEE Global Telecommunications Conference, Nov.-Dec. 1993, pp. 793-797.
Stiglmayr, Stephan, et al., "Adaptive Coding and Modulation in OFDM Systems using BICM and Rate-Compatible Punctured Codes", 7 pages.
G. J. Foschini, H. C. Huang, M. K. Karakayali, R. A. Valenzuela, and S. Venkatesan, "The value of coherent base station coordination," in Proceedings of the 39th Annual Conference on Information Sciences and Systems (CISS '05), The Johns Hopkins University, Baltimore, Md, USA, Mar. 2005.
Yiu, S., et al., "Distritbuted Space-Time Block Coding for Cooperative Networks With Multiple Antenna Nodes", Computational Advances in Multi-Sensor Adaptive Processing, Dec. 13, 2005, pp. 52-55.
Yiu, Simon, et al., "Optimization of Distributed Space-Time Filtering", IEEE 62nd Vehicular Technology Conference, Sep. 2005, pp. 1829-1833, Piscataway, New Jersey, USA.
Adachi, Koichi, et al., "Iterative Modified QRD-M Based on CRC Codes for OFDM MIMO Multiplexing", IEICE Transactions on Communications, Jun. 1, 2007, pp. 1433-1443, vol. E90B, No. 6, Tokyo, Japan.
Detert, Thorben, "An Efficient Fixed Complexity QRD-M Algorithm for MIMO-OFDM using Per-Survivor Slicing", IEEE 4th International Symposium on Wireless Communications Systems, Oct. 1, 2007, pp. 572-576, Piscataway, New Jersey, USA.
Robertson, Patrick, et al., "A Comparison of Optimal and Sub-Optimal MAP Decoding Algorithms Operating in the Log Domain", Proceedings of the International Conference on Communications, Jun. 18, 1995, pp. 1009-1013, vol. 2, IEEE, New York, USA.
Sun, Sumei, et al., "Pseudo-Inverse MMSE Based QRD-M Algorithm for MIMO OFDM", Jan. 1, 2006, pp. 1545-1549, vol. 3.
Dai, Yongmei, et al., "A Comparative Study of QRD-M Detection and Sphere Decoding for MIMI-OFDM Systems", 2005 IEEE 16th International Symposium on Personal, Indoor and Mobile Radio Communications, Jan. 1, 2005, pp. 186-190.
Korean Office Action for corresponding Korean Patent Application No. 2008-7025915, dated Feb. 9, 2010.
PCT International Preliminary Report on Patentability for PCT Patent Application No. PCT/US2008/076252, dated Apr. 1, 2010, 9 pages.
PCT International Preliminary Report on Patentability for PCT Patent Application No. PCT/US2008/073646, dated Mar. 4, 2010, 6 pages.
Su, W., et al., "Two Generalized Complex Orthogonal Space-Time Block Codes of Rates 7/11 and 3/5 for 5 and 6 Transmit Antennas", IEEE Transactions on Information Theory, Jan. 2003, vol. 49, No. 1, pp. 313-316.
US Office Action for U.S. Appl. No. 11/644,638, dated Sep. 30, 2010, 24 pages.
Korean Office Action for corresponding Korean Patent Application No. 2008-7025123, dated Sep. 29, 2010, 3 Pgs.
PCT International Preliminary Report on Patentability for PCT Patent Application No. PCT/US2009/035735, dated Sep. 16, 2010, 8 pages.
European Office Action for corresponding European Patent Application No. 07861675.2, dated Jul. 26, 2010, 4 pgs.
US Office Action for U.S. Appl. No. 11/754,903, dated Sep. 20, 2010, 18 pages.
US Office Action for U.S. Appl. No. 11/939,353, dated Sep. 22, 2010, 15 pages.
US Final Office Action for U.S. Appl. No. 12/209,110, dated Jul. 14, 2011, 26 pgs.
US Office Action for U.S. Appl. No. 12/335,409, dated Aug. 16, 2011, 20 pgs.
US Notice of Allowance for U.S. Appl. No. 11/664,638, dated Jun. 9, 2011, 10 pgs.
US Office Action for U.S. Appl. No. 11/754,903, dated Jun. 6, 2011, 11 pgs.
US Office Action for U.S Appl. No. 12/538,739, Dec. 7, 2011, 23 pgs.
US Final Office Action for U.S Appl. No. 12/335,409, Mar. 19, 2012, 22 pgs.
US Office Action for U.S Appl. No. 12/335,389, Apr. 12, 2012, 20 pgs.
PCT International Preliminary Report on Patentability for PCT Patent Application No. PCT/ US2010/033549, Nov. 17, 2011, 7 pgs.
US Notice of Allowance for U.S Appl. No. 11/754,903, Mar. 12, 2012, 8 pgs.

* cited by examiner

Cells of the same color (shading) coordinate transmissions

METHOD OF COMBINED USER AND COORDINATION PATTERN SCHEDULING OVER VARYING ANTENNA AND BASE-STATION COORDINATION PATTERNS IN A MULTI-CELL ENVIRONMENT

PRIORITY

The present patent application claims priority to and incorporates by reference the corresponding provisional patent application Ser. No. 61/088,712, titled, "A Method of Combined User and Coordination Pattern Scheduling over Varying Antenna and Base-Station Coordination Patterns in a Multi-Cell Environment," filed on Aug. 13, 2008.

RELATED APPLICATIONS

The present application is related to the following applications: U.S. patent application Ser. No. 12/538,729, filed Aug. 10, 2009, entitled "Variable Coordination Pattern Approach for Improving Performance in Multi Cell or Multi-Antenna Environments" and is related to U.S. patent application Ser. No. 12/538,739, filed Aug. 10, 2009, entitled "A Method for Varying Transmit Power Patterns in a Multi Cell Environment, " each filed concurrently filed herewith.

FIELD OF THE INVENTION

Embodiments of the present invention relates to the field of wireless transmission in a multi-cell wireless environment; more particularly, embodiments of the present invention relate to scheduling in a wireless communication system by varying user terminal rates based on some criteria (e.g., fairness) while varying coordination patterns.

BACKGROUND OF THE INVENTION

Operation of Cells and Multi-Cells and Cell Clusters

For purposes herein, a "cell" is used to describe a geographic area serviced by a set of (number of) transmit antennas. Such antennas can reside on one or more base-stations. They may be co-located at one point, or geographically spread over the cell. They may not even physically reside in the geographic boundary of the cell, though it is often the case they are physically located in the cell. For downlink traffic, this set of antennas services user terminals in the cell by jointly transmitting signals to such users. The transmitted signals are produced and controlled by a single common physical layer mechanism. That is, within a given "cell" the transmit antennas are coordinated. Such a common physical layer mechanism can be implemented by a number of processing entities that may be spread over a number of base stations, but which are jointly controlled to achieve a common result. The mechanism may also be implemented by a single processing entity. A classic example of such "cells" is shown in FIG. 1. Here the antennas are collocated at a base-station. Referring to FIG. 1, user terminals within classic hexagonally shaped cells are mapped to the base-station site that is "geographically closest" (e.g., the center of the call). This closest mapping results in the classic hexagonal pattern. For example, Cell 1 consists of a central set of 4 antennas at a single base-station, BS1, supporting a group of users including but not limited to user1, user2, user3, and user4. This "geographically closest" station rule makes sense in a model in which the received signal energy a user gets from any base-station (or antenna) decreases monotonically with the distance from that station, and by the same mathematical function for every station. In general, with shadowing and other effects, the cell boundaries will not conform to such a regular structure. In this classic multi-cell scenario, which has a fixed classic cell structure mapping users on a one-to-one basis with base-stations, a single base-station transmits only to users assigned to its cell.

It is well known that if neighboring base-stations use the same transmission resource (e.g., send signals on the same frequency band at the same time) that users in a cell will experience interference from other cells. Such "inter-cell interference" (ICI) can be quite extreme near the edges of cells, thus limiting performance for users in such areas. This is a classic problem with any cell structure. For example, user4 and user5 in FIG. 1 will experience high interference levels relative to their received signal levels. In contrast, users such as user1 and user2 may see less interference and less effect from a multi-cell environment. Nonetheless, all users do experience ICI.

A scheduling algorithm, such as a proportionally fair scheduling algorithm, can be used to ensure that users such as user1 and user2 are balanced fairly (or a desired fashion) with users seeing less favorable channel conditions such as user4 and user5. Without such a mechanism, if the system simply wanted to deliver the maximum per cell throughput, it would simply transmit only to users with the best channel conditions, severely penalizing other users such as user4 and user5.

To alleviate the detrimental effects of ICI, one can assume that cells coordinate their transmissions. One such way of doing so is to make sure neighboring base-stations do not use the same frequency at the same time. This results in the classic frequency reuse approach of a cellular system. Another way is to allow neighboring cells to use the same frequency at the same time, but to select signals for transmission that result in low ICI. One way to do so is to have a single underlying physical layer mechanism jointly control antennas from neighboring base-stations. In the extreme, one mechanism controls all transmit antennas over all stations, and the system reduces essentially to a single distributed antenna system with a common MIMO (downlink) broadcast (shared) channel. Here a user such as user4 in cell 1 is in fact serviced by signals coming from all antennas. In such an approach, ICI can be significantly reduced, even set to zero by Multi-user MIMO techniques such as Linear Zero-Forced Beamforming. In fact, in such an extreme the boundaries of "cells" have no meaning, and there are no longer uncoordinated signals crossing cell boundaries creating ICI. However, such a system is impractical.

A partial coordination may be more practical as shown in FIG. 2. Referring to FIG. 2, groups of cells (in this case three neighboring cells) can coordinate with each other. As illustrated, cells 1, 2 and 3 coordinate transmissions, cells 4, 5 and 6 coordinate transmissions, cells 7 and 8 coordinate, and cell 10 operates without coordinating with others. Each of these groups of three cells act as a single "cell", or what is termed a "cluster". If such coordination between base-stations is done correctly, users such as user4 and user5 can be made to see both less interference, and possibly better signal terms because they are no longer at a boundary with a neighboring cluster. They have now the option to use transmissions from up to 12 antennas over 3 remote locations. Thus, the system becomes more efficient. In addition, the scheduling of users in the cluster of cells 1, 2 and 3 can be done together.

However, because coordination is partial, such a system will inherently always have boundaries where users that see less favorable conditions. This is the case of users user6 and user7 in FIG. 2 which are at the boundary of two coordinating clusters.

SUMMARY OF THE INVENTION

A method and system is disclosed herein for scheduling in a multi-cell environment. In one embodiment, the system comprises a plurality of user terminals; a plurality of base stations to communicate with the plurality of user terminals, wherein the plurality of antennas from the base stations are grouped into coordination patterns that specify which antennas operate together as a cluster to coordinate transmissions with a subset of the plurality of user terminals, and further wherein the defined pairs of the antenna set and its associated user set vary over transmission resources based on coordination pattern changes such that different sets of antennas in the plurality of antennas are grouped together on different resources to coordinate transmissions to different subsets of users; and at least one controller to execute at least one scheduling algorithm to schedule transmissions with user terminals by specifying which user terminal to schedule for service by which sets of antennas and on which transmission resource and with what transmission rate.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
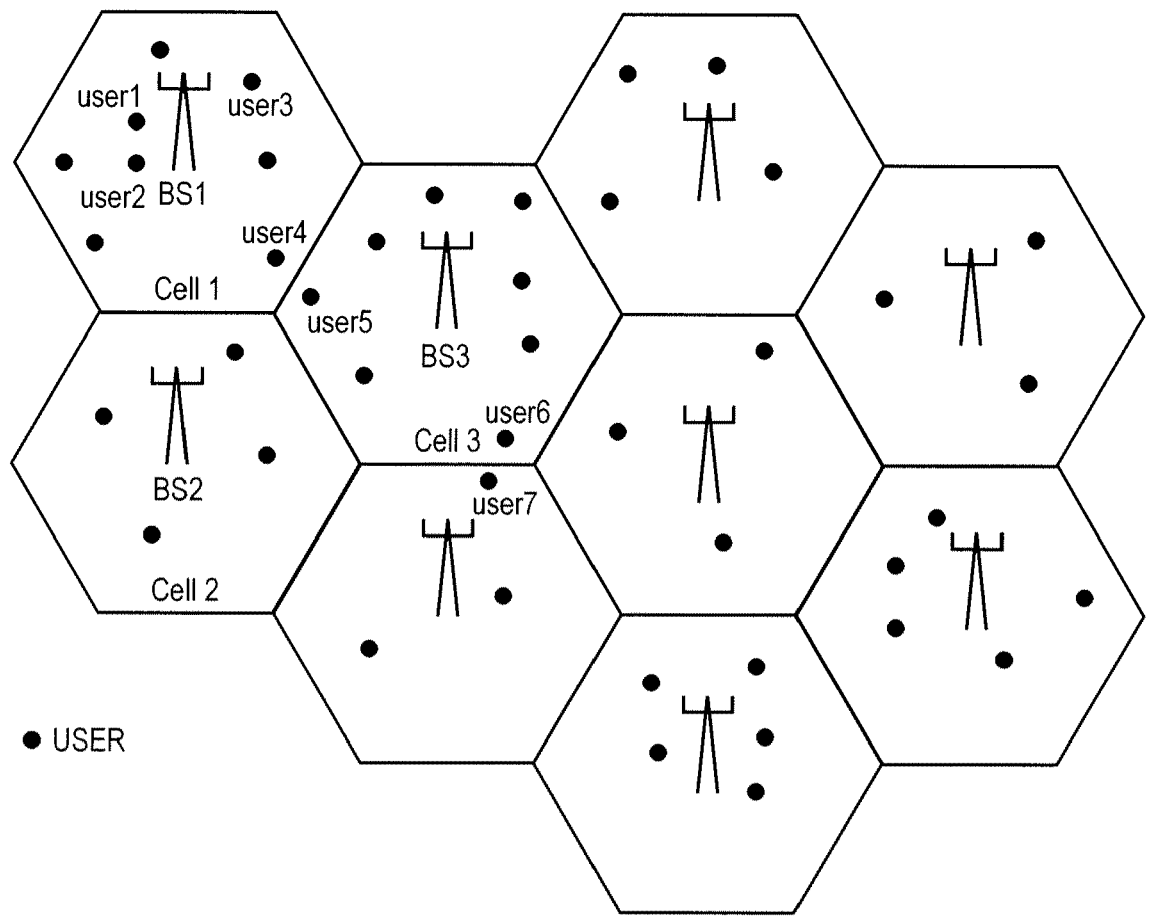
FIG. 1 illustrates user terminals within classic hexagonal cells mapped to a base-station in center of the cell.

A method and communication system for operating a user scheduling algorithm within a multi-cell system are described. In the multi-cell systems of interest, different subsets of antennas are used to transmit to different subsets of users, antennas within each subset can be coordinated in their transmissions, and the subset definitions can change over different transmission resources. A subset of antennas and the associated subset of users served by such antennas constitute what is termed an antenna-user pair. The totality of such pairs for a given transmission resource constitutes a coordination pattern. Such a pattern exists on a transmission resource, e.g. at a given time, and/or at a given frequency, and/or given tones, and/or different codes in a Code Division Multiple Access (CDMA) system. In all embodiments, the system varies the coordination patterns with transmission resources, such that at least two such patterns exist. For example, the coordination patterns can change over time (e.g., periodically) and/or over frequency (e.g., only some patterns on some frequencies) or some combination of both, or over any units of transmission resources, as described in U.S. patent application Ser. No. 12/538,729, filed Aug. 10, 2009, titled "A Variable Coordination Pattern Approach for Improving Performance in Multi-Cell or Multi-Antenna Environments", which is a non-provisional application of Application No. 61/088,714, filed on Aug. 13, 2008. Such changes in coordination patterns may occur in a known, and/or pre-determined controlled, fashion over time and/or over frequency. The operation of the user terminal scheduling algorithm described herein is for use with such a system whereby it takes particular advantage of such changes in coordination patterns. Its novel implementation in various embodiments is also tied directly to the physical embodiment of a system with varying coordination patterns. For example, the scheduling algorithm may be divided into a number of constituent scheduling entities which exchange sufficient information to make equivalent scheduling decisions to what a single global entity (knowing all information) would make. In one embodiment, the scheduling algorithm also directs (decides) what coordination pattern to use on what resource in an adaptive fashion.

Techniques disclosed herein include joint, or semi-joint, scheduling algorithms used to operate with a communication system that varies the multi-cell coordination topology. The scheduling algorithm itself can also influence the way the multi-cell system coordination topology is varied.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Clusters in Multi-cell Environments and User and Coordination Pattern Scheduling Embodiments of the invention include a method and operation of user scheduling for wireless multi-cell systems in which the pattern specifying the coordination of antennas, or equivalently the "cell" structure with coordinated base-station or distributed antenna systems, or coordination pattern of cells, is made to vary in a controlled fashion over transmission resources. Examples of such resources include slots in time and/or frequency. Such systems are described in more detail in U.S. patent application Ser. No. 12/538,729, filed Aug. 10, 2009, titled "A Variable Coordination Pattern Approach for Improving Performance in Multi-Cell or Multi-Antenna Environments". Such systems are made up of clusters of base stations coordinating, or cooperating, together for transmissions with user terminals in the respective clusters. The clusters are specified in coordination patterns. In one embodiment, the communication system varies the coordination pattern to enable users to see different interference levels over time (or other transmission resource), where the result is that some levels are more favorable than others. More specifically, coordinating transmissions across multiple cells, and varying such coordination patterns, can help prevent a user from being permanently disadvantaged with a high interference level, as happens to edge users in a system where coordination patterns do not vary.

Figure 2:
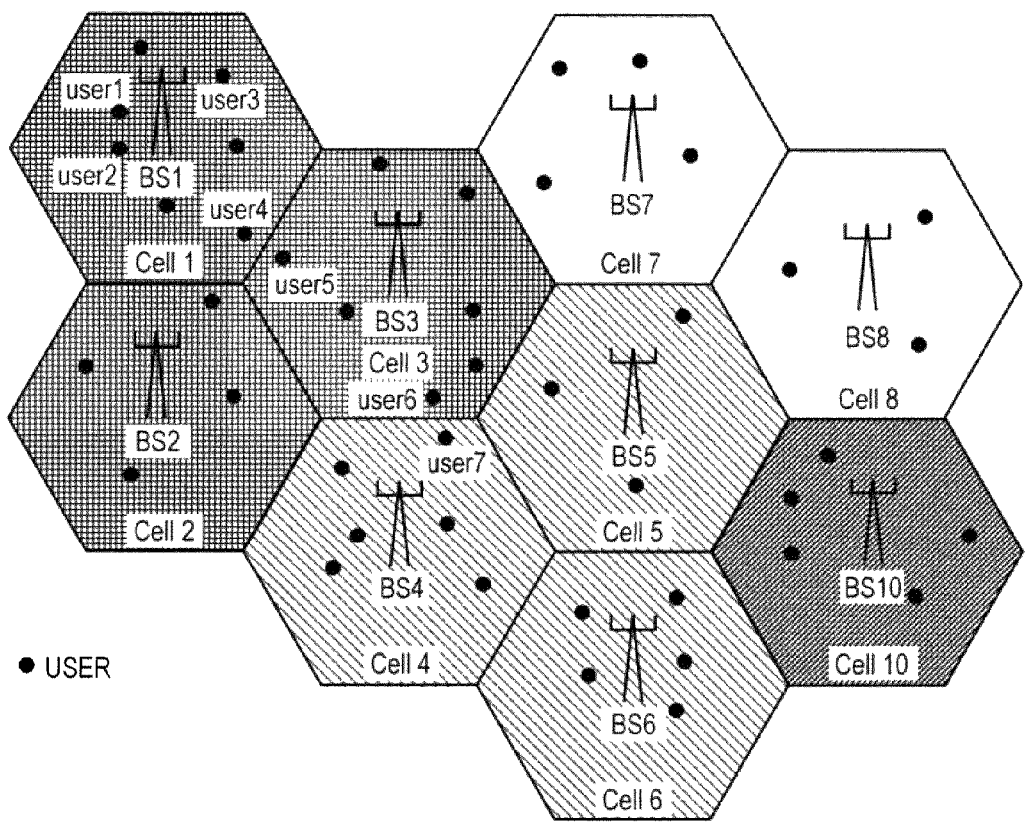
FIG. 2 is a diagram of a wireless communication system configured as a multi-cell environment with coordination among groups of cells.
Figure 3:
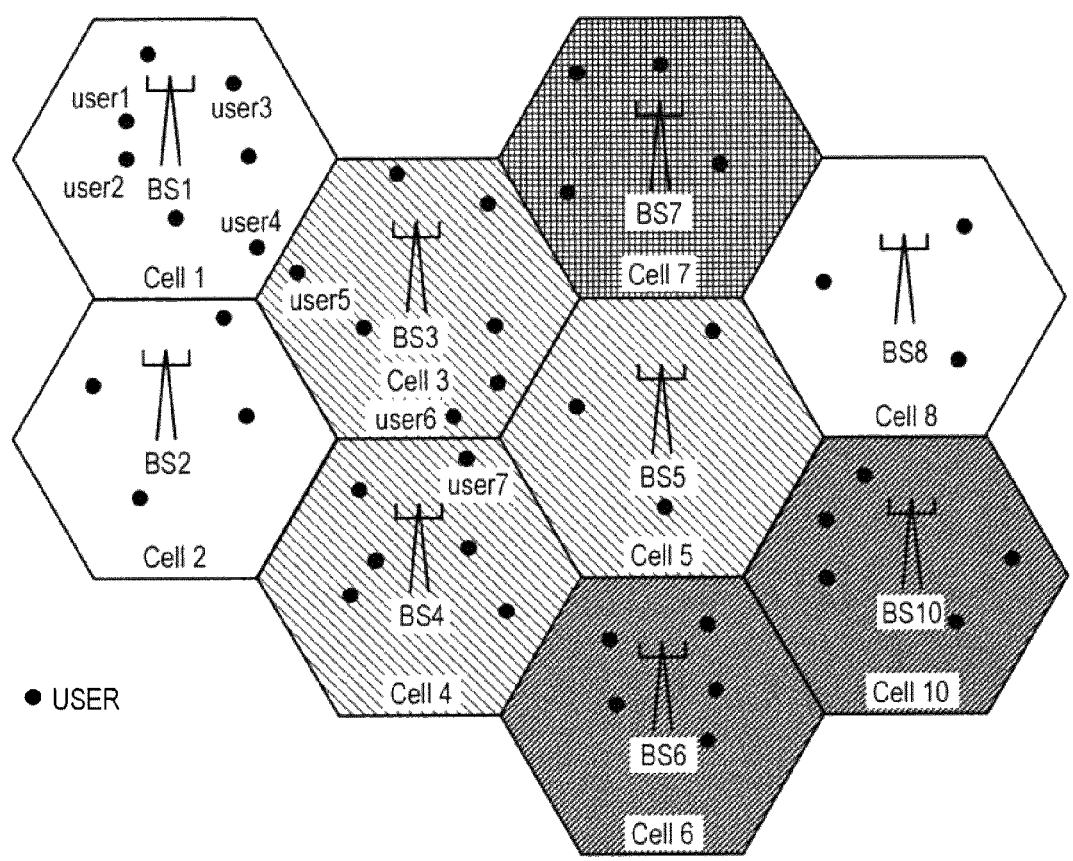
FIG. 3 illustrates a multi-cell case with coordination among groups of cells with a different coordination pattern than is shown in FIG. 2.

Two example coordination patterns that may be used are the patterns illustrated in FIGS. 2 and 3. Cells of the same shading coordinate their transmissions. That is, the antennas contained within these cells constitute one subset of antennas which coordinate. In FIG. 2, users "user4" and "user5" are at the center of a cluster of cells 1, 2 and 3 which coordinate. In contrast, "user6" is at the edge of this cluster. All users within cells 1, 2, and 3 form the user subset served by the antenna subset defined by antennas within these cells. In FIG. 2, also, "user7" is at the edge of a cluster of cells 4, 5 and 6 which coordinate. This cluster defines another antenna subset and another user subset. In FIG. 3, users "user6" and "user7" are now near the center of a different coordinating cluster of cells made up of cells 3, 4 and 5. Here now other users, e.g. user4 and user5, are at the edge of a cluster made up of cells 1 and 2. Thus, in the system, one can expect user4 and user5 to generally have more favorable interference levels under the pattern of FIG. 2 than under the pattern of FIG. 3. The opposite is true for users "user6" and "user7". Using a plurality of such patterns on different transmission resources, e.g. on different time and/or frequency slots (e.g., FIG. 2 is used on some frequencies while FIG. 3 is used on other frequencies), performance can be greatly increased for all users. This is particularly true for users that were originally "cell edge" users in FIG. 1.

Still, the invention disclosed in U.S. patent application Ser. No. 12/538,729, filed Aug. 10, 2009, titled "A Variable Coordination Pattern Approach for Improving Performance in Multi-Cell or Multi-Antenna Environments," allows for users to be served by multiple patterns. For example, it is not impossible (or preferable) to limit user6 and user7 to be serviced only when the cluster pattern in FIG. 3 is in effect. They may (through random variations in channels or other criteria) also find it advantageous to be serviced for other cluster patterns (e.g., the pattern in FIG. 2 or any other pattern). However, for this system to work, given a user has many opportunities over many coordination patterns and transmission resources and instances to be served, there needs to be a system in place to decide which users are scheduled on which cluster patterns, and when scheduled with what rate.

User and Coordination Pattern Scheduling

To serve all users in a wireless system, and to serve them in an efficient and/or fair fashion, it is often the case that it is either necessary and/or beneficial to decide when to transmit users across the available transmission resources. For example, if resources are in slots in time, in each slot a decision is made on which user or users to serve. Similarly if resources are in bands or tones of frequencies, on each tone or within each band, the system may decide on different subsets of users to serve. This is of course required to share such resources among users in a fashion deemed fair, acceptable, or in accordance to the goal of the system. However, further benefits can be obtained from scheduling. For example, benefits can be gained by taking advantage of what is termed "user diversity", whereby users are scheduled when it is advantageous to do so (e.g., given variations in channel conditions). This operation is performed by a scheduler executing a scheduling algorithm, and it applies to many wireless systems.

Embodiments of this invention are focused on a class of wireless systems in which the coordination of antennas, or equivalently the "cell" structure with coordinated base-station or distributed antenna systems, or coordination pattern of cells, of the wireless multi-cell system is made to vary in a controlled fashion over transmission resources. Such resources can be for example defined in terms of time slots and/or frequency bands or tones. Here, with such variation in patterns, the operation and design of an efficient scheduler is not obvious or a trivial extension of systems either with a simple (fixed) single cell structure or a single coordination pattern. In such fixed systems, a given user is only served by one cell, or only served by one set of coordinated antennas, or only served by one cluster. Opportunities to serve this user are limited to transmission resources available to that single cell, or single coordinated set of antennas, or single cluster. It is therefore sufficient that each cell, coordinated set of antennas (CSoAs), or cluster have its own scheduling algorithm that operates independently of other cells/CSoAs/clusters with respect to this user. Each such algorithm can operate in well known fashions. However, when users can be served by multiple patterns, use of independent algorithms over each cluster over each pattern can become very inefficient. Users are members of multiple cells/CSoAs/clusters, over multiple transmission resources. The system then has multiple pairs of CSoAs and user sets (or multiple pairs of cells and user sets, or multiple pairs of clusters and user sets) where such user sets intersect (have common members). For the sake of simplicity such pairs of sets simple will be referred to herein as "antenna-user pairs". Balancing when a user is scheduled over each pair requires some coordination among schedulers across cells/CSoAs/clusters and across resources and transmission opportunities.

The systems described herein include one or more schedulers that execute a scheduling algorithm(s) to perform scheduling for the variable coordination pattern system. Methods and structures for performing a scheduling algorithm that acts in a joint (not independent) fashion over multiple coordination patterns.

In some embodiments, a single, effective, global scheduling algorithm can be composed of smaller constituent scheduling algorithms that focus on each of the antenna-user associated pairs (or associated cell-user pairs, or associated cluster-user pairs). To operate effectively as a global algorithm, these constituent schedulers pass and share sufficient information between each other so as to operate jointly, or semi-jointly. In some embodiments, such "sufficient information" consists of which users were scheduled and the sum or average rates such users have seen over a given time period. Such sufficient information can allow the joint operation of constituent schedulers to make the same scheduling decisions as a single (global) joint scheduler, implemented by a single processing entity having all necessary information.

In one embodiment, the way the constituent scheduling algorithms are executed is linked to the way the system varies the coordination pattern of antennas to users. That is, a constituent scheduling algorithm is tied to a given antenna-user associated pair or group, or a pair existing on a given transmission resource.

In another embodiment, the global scheduling algorithm can determines which coordination patterns to use at a given transmission resource (e.g., at a given time and frequency), and thus directs when and what constituent schedulers operate (e.g., over time and frequency).

In yet another embodiment, a global central scheduling algorithm, for a given set (or sequence of) transmission resource (e.g., set or sequence of time or frequency instances), examines all users, all antennas, and schedules user terminals according to the constraints of which antennas can signal to which user terminals and when. In this case, a central entity makes the scheduling decisions.

Example of Fair Scheduling

In one embodiment, a scheduler (whether constituent or global) executes a scheduling algorithm to select which user terminals to transmit to on what transmission resource, and with what rate. For a given resource, the user is a member of an antenna-user pair, which specifies what antennas/cell/cluster serves the user on this resource. The scheduling algorithm ensures that users are given fair access to the transmission resources. Fair is determined with respect to a criterion (e.g., proportional fair rate, maximizing minimum per user rate, etc.). Those skilled in the art are familiar with such algorithms when used for systems in which the antenna-user pair is fixed over all possible resources that may be used to serve a user. It should also be stressed that the criterion under which the scheduler operates can be one of a variety of criteria and do not necessarily have to be "fair criterion". It can for example be one based on a purposeful differentiated service which tries to give some users more rate than others, for reasons such as cost, revenue, application requirements.

In order to meet the "fair criterion", a scheduler keeps track of when users were scheduled, and at what rate, in order to operate in an intended fashion. If a user is associated with only a single antenna-user pair, it is sufficient that each such antenna-user pair have its own independent scheduling algorithm handling only users in this pair. This for example happens in a fixed cell structure or in cluster systems with a fixed cluster structure. In systems considered in this invention a user is served by different cell/CSoAs/cluster arrangements, and different schedulers. In this case, it is not sufficient that each scheduler keep track only of the rates and users it schedules for a given antenna-user pair.

As mentioned, embodiments of the invention can use many types of schedulers. In one embodiment, the scheduler tries to schedule users (in a cell or cell cluster) so as to maximize a weighted sum rate criterion $$\sum_{All\ k} w(k) R(k)$$

where R(k) is the average rate with which user-k is to be (or is) served, and w(k) is a weight, such that $w(k) \geq 0$. Of course, over the operation of the system, the vector of achieved values R(k) is influenced by w(k), the physical layer and the scheduler. Thus these values can additionally be functions that adapt over time, i.e. R(k) may be $R_t(k)$ where "t" determines the value at time "t".

In one embodiment, the choice of the weight is determined off-line. In another embodiment, the weights are selected to make the scheduler give each user a what is termed a proportionally fair share of the rate, proportional to what it can achieve. Such a scheduler is called a Proportionally Fair Scheduler (PFS), which is well-known in the art. For example, see D. Tse and P. Viswanath, Fundamentals of Wireless Communications, Cambridge University Press, Cambridge, 2005. In such an embodiment, to select weights in order to achieve PFS, approximately, one can select weights at the j-th scheduling event as $$w_j(k) = \frac{1}{\hat{R}_j(k)}$$

where $\hat{R}_j(k)$ is an estimate of the rate a user has received up to the j-th scheduling event ("j" being similar to the time "t" but in units of scheduling instances). In one embodiment, the estimate is done based on past scheduled events. In one embodiment, the estimate is the average rate received by the user up to that point "j" in time. In another embodiment, the estimate is a weighted average rate (e.g., an exponential weighting going back in time). For a system to operate in the desired fashion, the estimate should reflect the average rate a user sees over all possible resources that are serving that user.

In a system which serves only one user per antenna-user pair at the j-th scheduling event, a scheduler determines rate it can serve each user, and which user to serve based on the weighted metric, given the weights. For example, assume based on the channel state information or signal to noise ratio, or signal to interference and noise ration, of its users, it is determined that at the j-th scheduling event a rate $Z_j(k)$ can be the rate sent to the user k, if it is scheduled alone. Then the scheduler tries to select the user "k*" so as to maximize the scheduled weighted sum rate at the j-th interval, as determined by the user "k*" maximizing the following equation:

$$k^* = \arg\max_k w_j(k) Z_j(k)$$

In the embodiment, the weights are determined for a user using information about the user's scheduled rates over all coordination patterns, not just the antenna-user pair of this (or one) scheduler.

In systems which can serve more than one user at a given transmission opportunity, a decision is made on a subset of users to serve. A subset of user terminals is denoted as $\Omega$. Therefore, Z is now a function of both k and $\Omega$, i.e. $Z_j(k, \Omega)$. In one embodiment, the scheduling algorithm executed by the scheduler tries to select users forming a subset $\Omega^*$ so as to maximize at the j-th interval $$\Omega^* = \text{argmax}_\Omega \sum_{\text{over } k \text{ in subset } \Omega} w_j(k) Z_j(k, \Omega).$$

Note, in a MU-MIMO wireless communication system in particular, the user rates $Z_j(k, \Omega)$ often does depend on the subset of users scheduled for transmission. For example, Linear Zero Forcing (the beams/zero forcing vectors and power allocations to those vectors) or Dirty Paper Coding solutions depend on the subset $\Omega$ of users. Such procedures are known to those familiar with the state of the art. In the embodiment, the weights are determined for a user using information about the users' scheduled rates over all coordination patterns, not just the antenna-user pair of this (or one) scheduler.

Recall, for a system to operate in the desired fashion, information such as the rate estimate $\hat{R}_j(k)$ should reflect the average rate a user sees over all possible resources that are serving that user. For each associated pair of transmit antennas and users, a naive and inefficient system can operate scheduling algorithms that are independent of the scheduling algorithms run for other pairs. Here the values "$w_j$" (equivalently values $1/\hat{R}_j(k)$ for schedulers such as PFS) are values local to each scheduling algorithm, and independent (and different) from scheduler to scheduler despite the fact that a user-j may be common to many antenna-user pairs. In this sense, each of the scheduling algorithms operate independently for each pair, making whatever use of the user diversity, transmission options, etc. represented in the pair. This is the standard operation in most prevailing systems since the associated pair of antennas and users is fixed, and a user is a member of only one such pair. When antenna-user pairs change over transmission resources, so that a user is a member of at least two or more pairs over at least two or more resources, independent operation is not efficient.

The scheduling algorithms for systems of interest in this invention, in which users are served over multiple antenna-user pairs, do not operate independently. In some embodiments, independent schedulers are replaced by "constituent" scheduling algorithms that work together to effectively implement a global scheduling algorithm. To do this, if two different pairs of antenna and users share some common users, the operation of the schedulers for such pairs is made dependent. In one embodiment, this is achieved effectively by changing the calculation of the weights "$w_j$". Specifically the weight "$w_j$", for a user j common to two or more antenna-user pairs (common to two or more constituent schedulers) is a value that depends on the operation of all corresponding schedulers that can schedule this user. In one embodiment, there is a global common "$w_j$" value, stored possibly in a central repository, and requested when needed by the constituent schedulers. To make this value meaningful, schedulers would also send updates on the average rate at which they are serving user j so that the central repository can adjust and update the global common "$w_j$" value accordingly to reflect the average rate over all schedulers. In one embodiment, there is a global common "$w_j$" value that is shared via transmissions forwarded between constituent schedulers that can schedule user j.

In another embodiment, each scheduler has their own copy of "$w_j$", where local values may not be the same. However, the values are dependent on each other and are approximately the same. To make values dependent in this way, information about user-j is exchanged between schedulers to ensure the individual values of weight "$w_j$" are either the same, or sufficiently similar (and thus dependent). For example, in one embodiment, all schedulers send their own local copies of "$w_j$" to all schedulers that handle user j. Each scheduler replaces their local copy of "$w_j$" by a (sufficiently) weighted mean of all the individual "$w_j$" values it receives from other schedulers. The weighting of such a mean may reflect how much resources each scheduler has at its disposal, where more weighting is given to "$w_j$" values from schedulers with more resources. Then each scheduler would operate for a number of transmission opportunities using this value, and operating independently of other schedulers, updating its local measure of "$w_j$" based on its own independent scheduling events, after which local copies of "$w_j$" are exchanged again, and the process repeats. Thus individual weight values "track" each other and are sufficiently close.

An interesting feature of such a system is that the schedulers do not have to exchange information about each and every scheduling event, or interact with schedulers about each and every scheduling event. They (for many schedulers including PFS) sufficiently only need to exchange information such as the sum of rates with which they serve a user over intervals of time.

Deployment and Inter-Connectivity of Constituent Schedulers

Figure 6:
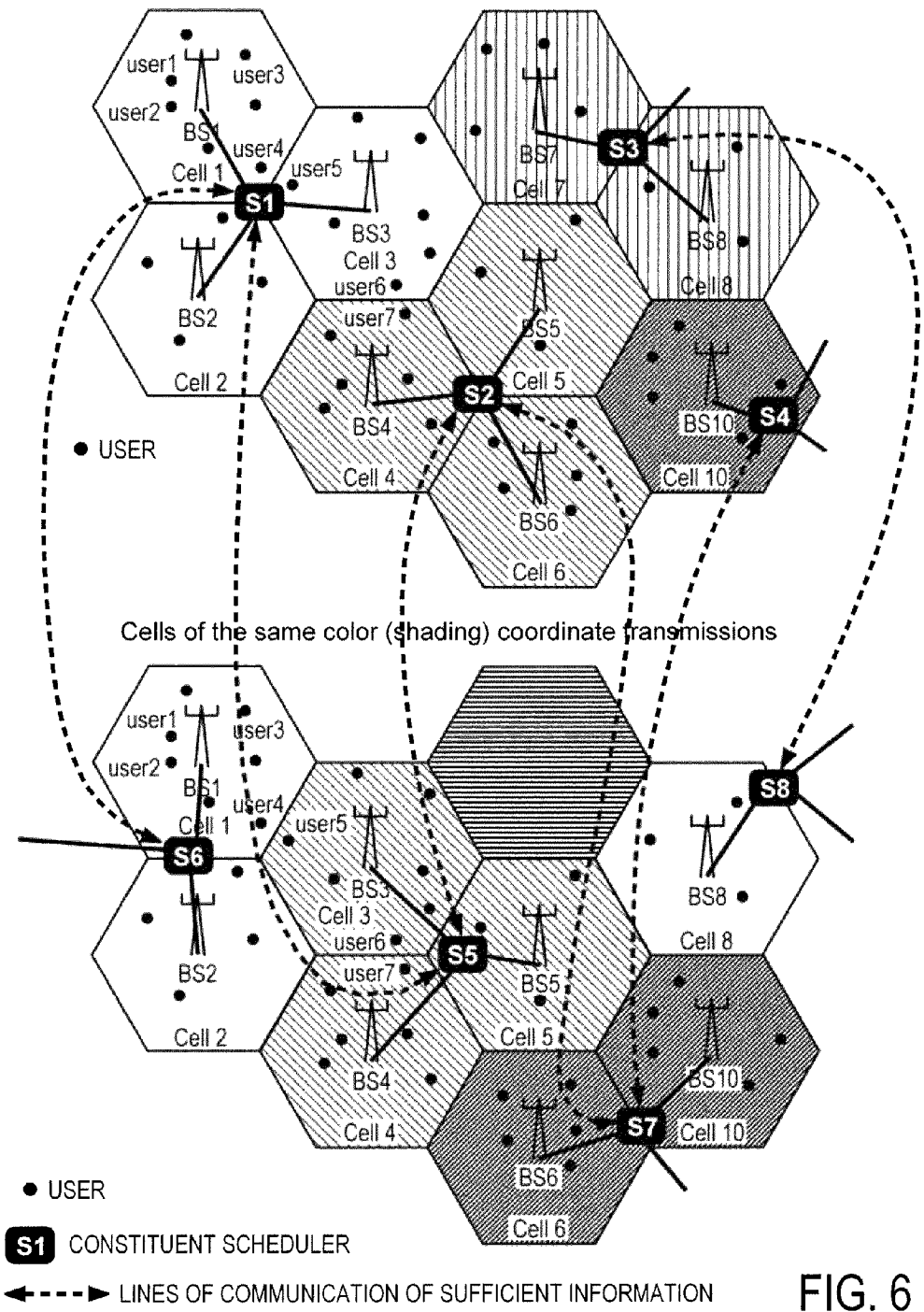
FIG. 6 illustrates information is shared between constituent schedulers in FIG. 4 and FIG. 5 where some scheduler serves the same (common) users over different coordination patterns (such patterns exist on different transmission resources).

In one embodiment, the scheduling system is composed of a number of constituent schedulers. FIG. 6 is a diagram of a communication system that includes constituent schedulers that serve common users and share information about those users.

Figure 4:
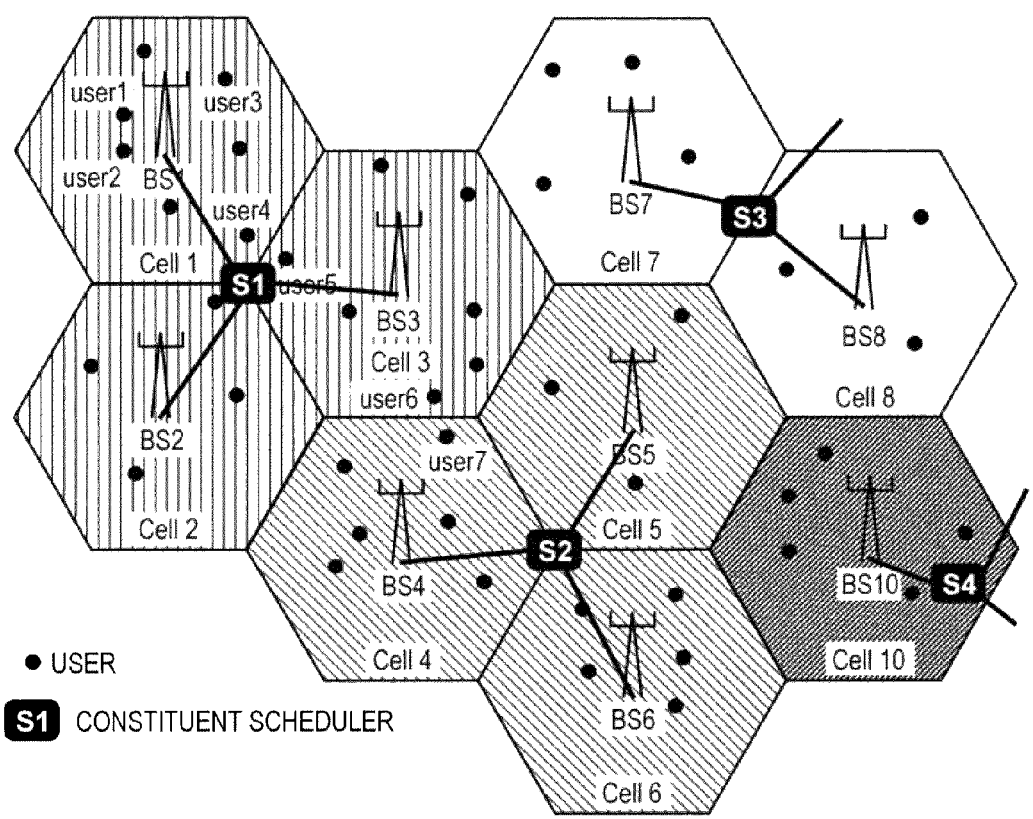
FIG. 4 illustrates constituent schedulers that may be used in the coordination pattern of FIG. 2.
Figure 5:
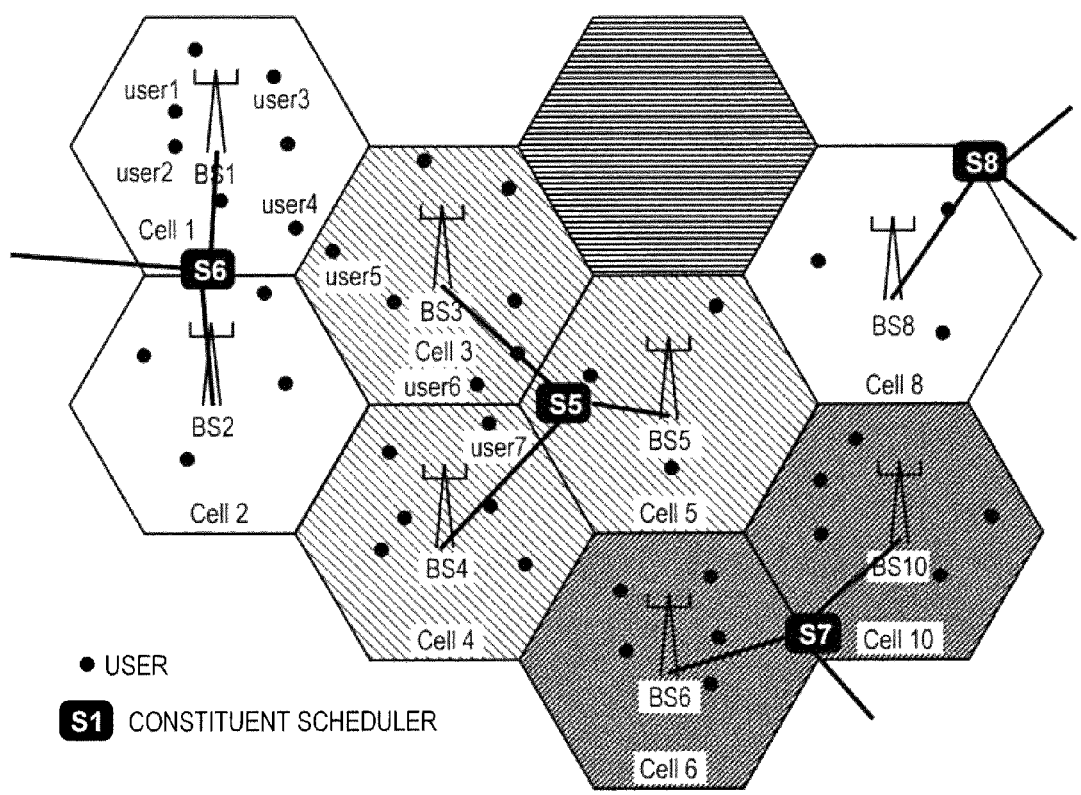
FIG. 5 illustrates constituent schedulers that may be used in the coordination pattern of FIG. 3.

Referring to FIG. 6, the system is shown with two coordination patterns, which are depicted in FIGS. 4 and 5. FIG. 4 illustrates a number of such schedulers S1, S2, S3, S4, corresponding to the clusters of FIG. 2. Scheduler S1 is the scheduler for base stations (BS) 1, 2 and 3 of cells 1, 2 and 3 respectively, scheduler S2 is the scheduler for base stations 4, 5, and 6 of cells 4, 5 and 6 respectively, scheduler S3 is the scheduler for base stations 7 and 8 of cells 7 and 8 respectively, and scheduler S4 is the scheduler for base station 10 of cell 10. FIG. 5 illustrates a number of such schedulers S5, S6, S7, S8, corresponding to the clusters of FIG. 3. Scheduler S5 is the scheduler for base stations 3, 4, and 5 of cells 3, 4 and 5 respectively, scheduler S6 is the scheduler for base stations 1 and 2 of cells 1 and 2 respectively, scheduler S7 is the scheduler for base stations 6 and 10 of cells 6 and 10 respectively, and scheduler S8 is the scheduler for base station 8 of cell 8. Connections between schedulers and base-stations signify which base-stations are used in the respective cluster of the scheduler. Note that connections can be via wired or wireless communication.

As shown together by FIGS. 4 and 5, user terminals can be members of different clusters over time or frequency. For example, user5 and user6 are scheduled by scheduler S1 in the channel resource used (e.g., frequency and/or time interval) by FIG. 4, and by scheduler S5 in channel resource used (e.g., frequency and/or time interval) by FIG. 5. This reflects operations of the varying multi-cell systems of interest.

Referring back to FIG. 6, each of the schedulers receive from the physical layer channel state information that provides information on the state of the channels that exist between user terminals in a cluster and antennas in a cluster. The schedulers also know which user terminals are associated with each of the antennas. In one embodiment, the schedulers also have access to information about one or more of the users' estimated service rate $\hat{R}_j(k)$, users' rate requirements, users' previous scheduled events, and users' assigned rates.

In this embodiment, the schedulers behave in a joint fashion, and different schedulers handle the same users over different transmission resources, e.g. over different time and/or frequency intervals. They do this by sufficiently sharing information that is sufficient for scheduling. The sharing of such information is illustrated by the lines of communication between schedulers in FIG. 6. More specifically, schedulers S1 and S6 share information about common users in cells 1 and 2, schedulers S8 and S9 share information about common users in cell 3, schedulers S2 and S5 share information about common users in cells 4 and 5, schedulers S2 and S7 share information about common users in cell 6, scheduler S2 and S8 share information about common users in cell 8, and schedulers S4 and S7 share information about common users in cell 10. For example, for a Proportionally Fair Scheduler (PFS), they share sufficient information to make "$w_j$" values of common users either the same or approximately the same.

In one embodiment, the scheduler determines the rate information by sharing only sufficient information for this purpose by directly transferring such information between constituent schedulers (without use of a central repository). In one embodiment, the only information that is shared is the sum or average rates of such users are given by each of the schedulers. For example, in one embodiment, it is sufficient for S1 to tell S5, and S5 to tell S1, when and with what rate it has scheduled user terminals such as user5 and user6 common to both schedulers. In other embodiments, this may be more than sufficient information. For example, if $w_j(k)$ is set as the average rate as discussed above, it is also sufficient for S1 to tell S5, and for S5 to tell S1, only the average rate that it has served such users over a given number of transmission opportunities. Therefore, each scheduler can, with the average for each coordination pattern, weigh each average over the number of scheduling opportunities a scheduler has, and compute the average rate each user terminal has been served over all coordination patterns.

It may also be sufficient for S1 to tell S5, and S5 to tell S1, the weight it used. In one embodiment, weights are updated within each scheduler (e.g., S1) based on its scheduling of user terminals, and the change in such weights as seen from interval to interval by other schedulers (e.g., S5) provides information as to how a user terminal was served.

In one embodiment, the weights are determined for a given user terminal using past information on when and at what rates user terminals were scheduled. In one embodiment such weights are determined for a user terminal using information about the user terminal's scheduled rates over all coordination patterns (all schedulers which consider the user). At the same time, when a constituent scheduler is making a decision (e.g., scheduler S1), it is sufficient for scheduler to know or determine only the weights "$w_j$" of its user terminals. For PFS, this is just the inverse of the average rate.

In one embodiment, the schedulers also ensure user terminals are scheduled with a maximum latency. Such a maximum latency value may be application dependent. For example, in voice communication, it is necessary to send a packet at least once every block of x msec, where "x" depends on the system but is typically on the order of 10 to 30 msec. If schedulers also have some requirement to ensure users are scheduled (given some rate) with some maximum latency, it is sufficient for S1 to tell S5, and S5 to tell S1, only the average rate (or weights) that it has served such user terminals, and the last time it served such user terminals.

In one embodiment, weights are determined by some other criteria (e.g., how much a user pays, the application it is running, etc.). If the weights are determined by some other criterion/criteria, the scheduler may not in fact update weights, but would use (or set) weights according to that criterion/criteria.

In one embodiment, the channel state information is not (necessarily) exchanged between the constituent schedulers. The information shared is sufficiently limited to only the scheduling information (i.e., information sufficient for scheduling). In one embodiment, each constituent scheduler uses the channel state information to compute the potential scheduled rates $Z_j(k)$, along with the computed weights, that apply only to users in its cluster. Another constituent scheduler does not need to know such channel state information. It just needs to know the rates (or sum rate) for each user scheduled.

In another embodiment, which can use similar scheduling techniques and information sharing requirements as described above, the information used by the schedulers to operate in joint or semi-joint fashion is stored in one or more central repository locations. In one embodiment, for PFS schedulers, the information in the central repository should be sufficient to provide a measure of the average rate a user has received up to a given time over all possible transmission resources it has. Such information thus does not need to include each and every scheduling instance, and the rates for each instance; it only needs to be sufficient to determine the average rate a user has seen. Sufficient information for such a purpose could be periodic (not real time) updates on the total rate each constituent scheduler has given the user. As such, a total rate over all schedulers can be determined and converted to an average measure over various intervals in time.

Figure 7:
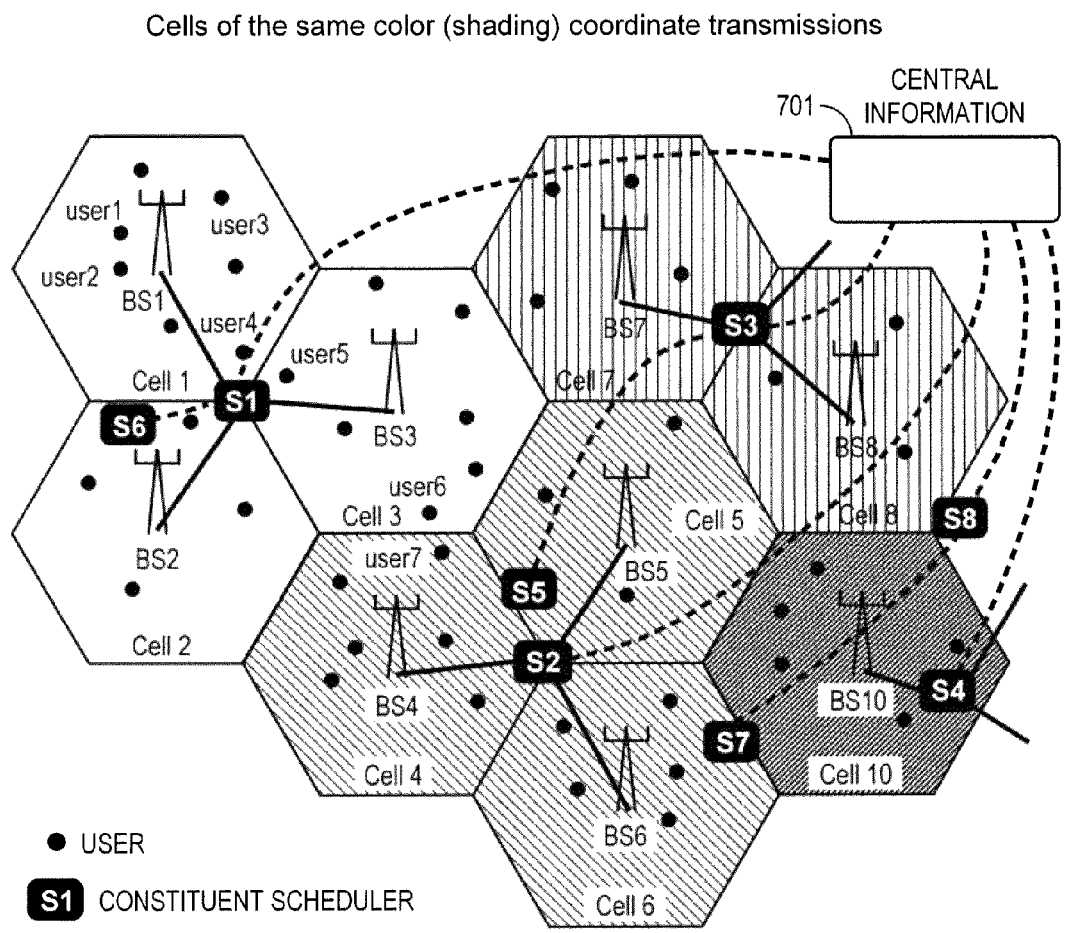
FIG. 7 illustrates a communication system where some of the information necessary for each constituent scheduler to perform its own scheduling is stored centrally.

FIG. 7 illustrates the case with a single central location at central entity 701 serving all of the scheduling entities S1-S8. In one embodiment, this central entity 701 resides for example on a backbone network (e.g., an IP based network). The latencies over such a backbone may be large compared to the interval of scheduling events. In one embodiment, if this is true, the system considers that information up to a certain time is sufficient to do the scheduling in the j-th interval. For example, it is possible that the central entity 701 may only have, at the j-th interval, information up to the (j-K)-th interval, where K is some acceptable number. In this way, coordination of the scheduling over the entire system does not have to be done with the stringent latency requirements as may be required by a full coordination at the physical layer signaling.

The schedulers S1-S8 request updates from central entity 701 either before every slot they operate, or with some regular interval. The schedulers S1-S8 entities also send updates to central entity 701 either after every slot they operate, or with some regular interval. When updating over intervals, often information need only reflect the sum or average of such information over the interval, e.g. the sum or average rate with which a scheduler served each of its users over the interval.

Scheduling entities may also send information via other entities. As shown in FIG. 7, scheduler S6 sends information through scheduler S1, scheduler S5 sends information through scheduler S3, and scheduler S7 sends information through scheduler S8. This allows 1. Some entities to get necessary information they need before it is sent to the central entity. In fact, they would therefore not need to request such information from a central repository.
2. Possibly to simplify the backbone interconnection of entities.
3. Reduce the information requested from the central entity, particularly where all information comes between entities. For example, they may able to obtain all the information they need for their users through such inter-scheduler exchanges and forwarding of information.

In another embodiment, the information sent from the central entity to schedulers is only the weights $w_j(k)$. The central entity maybe able to calculate such weights. This calculation may be made by seeing a sufficient amount of past scheduling information from all schedulers, and then sending only the weights needed to each of the constituent schedulers.

In yet another embodiment, only a subset of controllers needs to know and track the rates of any given user terminal for scheduling. Consider an arbitrary user terminal k. Let A(k) denote the set of controller/schedulers that can schedule user k. In one embodiment, another set of entities B are associated with storing scheduling information about distinct user terminals. In this embodiment, one or more entities in the union of the sets A(k) and B is used as scheduling information repository for user terminal k. As such, the repositories for the "k"th user terminal are responsible for providing the scheduling algorithm weights for the "k"th user terminal to the controllers scheduling that user terminal at an given time, as well as for knowing the scheduled rates of the "k"th user terminal and calculating its updated weights.

In one embodiment, the repositories are chosen from user terminal k from the set A(k) only. The repositories can be selected according to, for example, one of the following methods: (i) the controller that is closest to user terminal k is chosen as a single repository for that user; (ii) each of the controllers in the set A(k) is chosen as repository for a given period (e.g., a round robin fashion over some period of transmission opportunities); (iii) all the controllers are chosen as repositories; and (iv) a subset of controllers is a priori designated as repositories and all the designated repositories in the set A(k) is chosen as repositories for user k.

Figure 8:
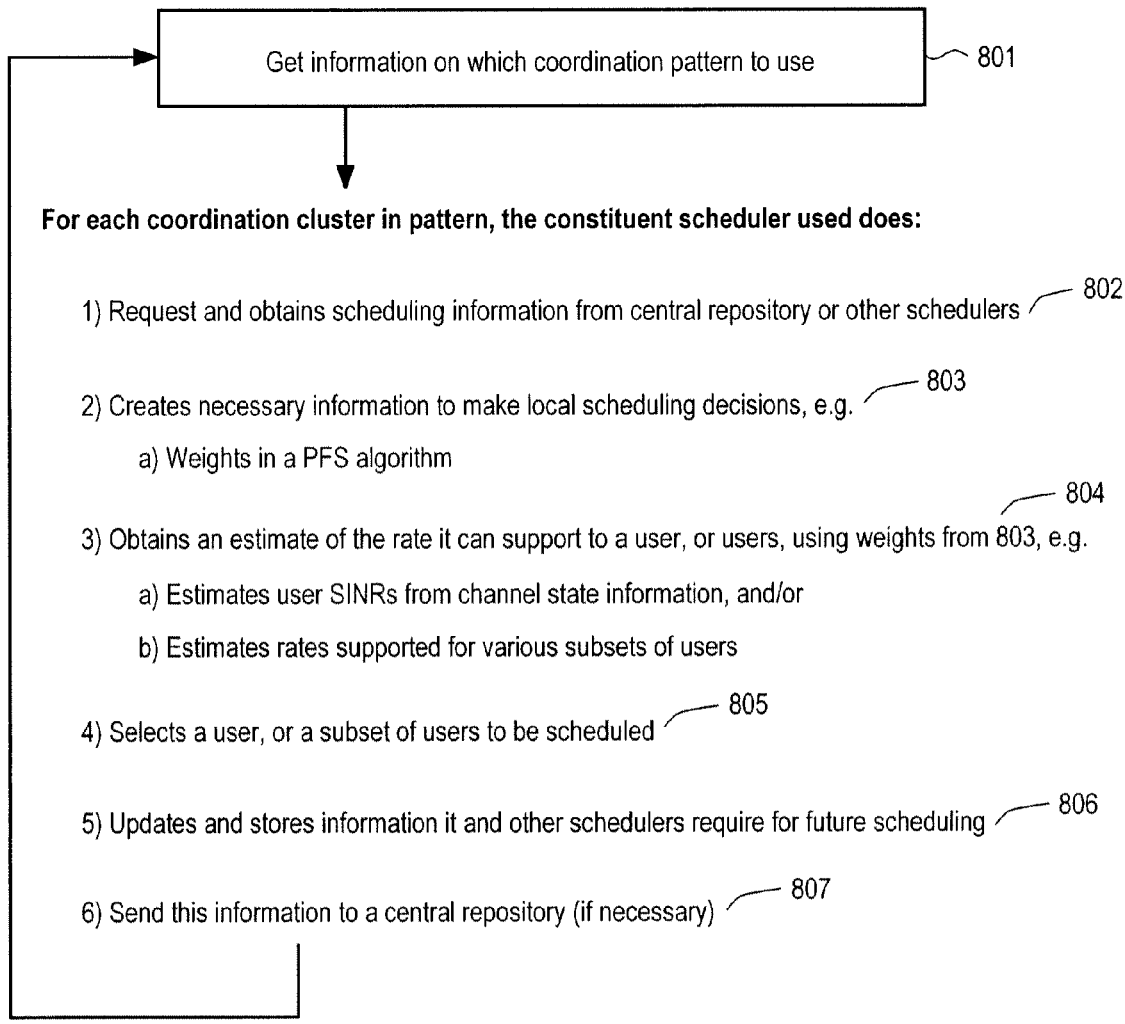
FIG. 8 is a flow diagram of one embodiment of a scheduling process which uses a central repository.

FIG. 8 is a flow diagram of one embodiment of a scheduling process. The process is performed by processing logic that may comprise hardware (circuitry, dedicated logic, etc.), software (such as is run on a general purpose computer system or a dedicated machine), or a combination of both. The scheduling process is performed by a scheduler.

Referring to FIG. 8, the process begins by processing logic receiving information on which coordination pattern to use (processing block 801). This pattern could be predetermined, e.g. as determined by a sequence of stored pattern decisions. After receiving information on which coordination pattern to use, for each coordination cluster (antenna-user pair) in the pattern, processing logic in the constituent scheduler serving this antenna-user pair requests and obtains information (if it does not already have it) from a central repository or other schedulers (processing block 802) and creates necessary information to make local scheduling decisions (processing block 803). In one embodiment, the necessary information includes information to determine the weights in a PFS algorithm.

Next, for each coordination cluster in the pattern, processing logic obtains an estimate of the rate it can support to a user terminal or terminals (processing block 804). In one embodiment, the estimates include estimates of user terminal SINRs from channel state information. In another embodiment, the estimates include estimates of rates supported for various subsets of users. In yet another embodiment, the estimates include both the user terminal SINRs and the rates supported for the various subsets of users.

Then, for each coordination cluster in the pattern, processing logic selects a user terminal, or subset of user terminals to be scheduled (processing block 805), updates and stores information it and other schedulers require for future scheduling (processing block 806), and sends the information (required to update weights or other variables for common users) to a central repository, if necessary (processing block 807). Such updates can happen after every scheduling event, or after a number of scheduling events as previously described. Thereafter, the process transitions to processing block 801 and the process repeats.

In another embodiment, a central repository is not used. Here processing block 802 does not get information from a central repository, but possibly from a number of repositories and/or a number of other constituent schedulers as, for example, previously described when discussing FIG. 6.

In another embodiment, processing block 807 does send update information to a central repository, but possibly to a number of repositories and/or a number of other constituent schedulers as previously described when discussing FIG. 6.

A Coordination Controller Embodiment

Figure 9:
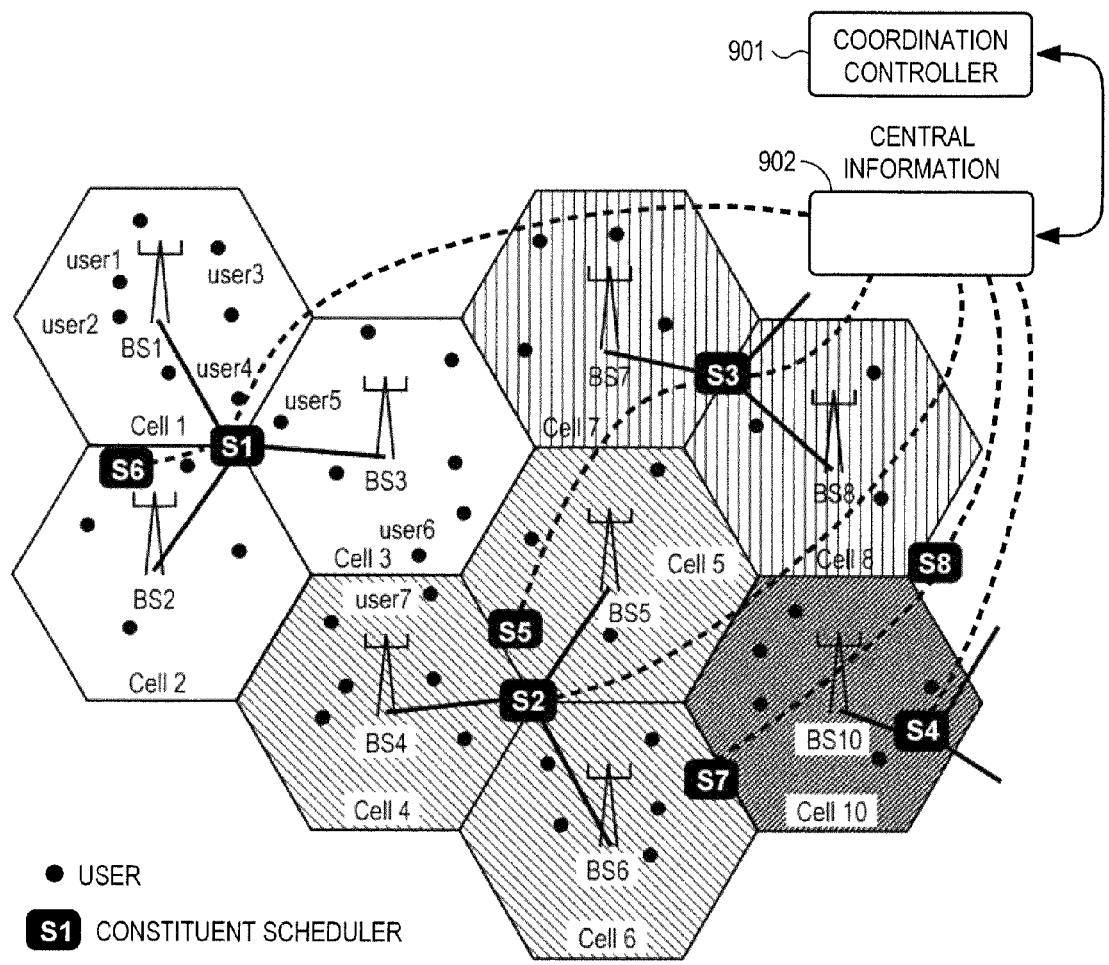
FIG. 9 is a diagram of one embodiment of a communication system that includes a coordination controller that decides what coordination pattern to use.
Figure 10:
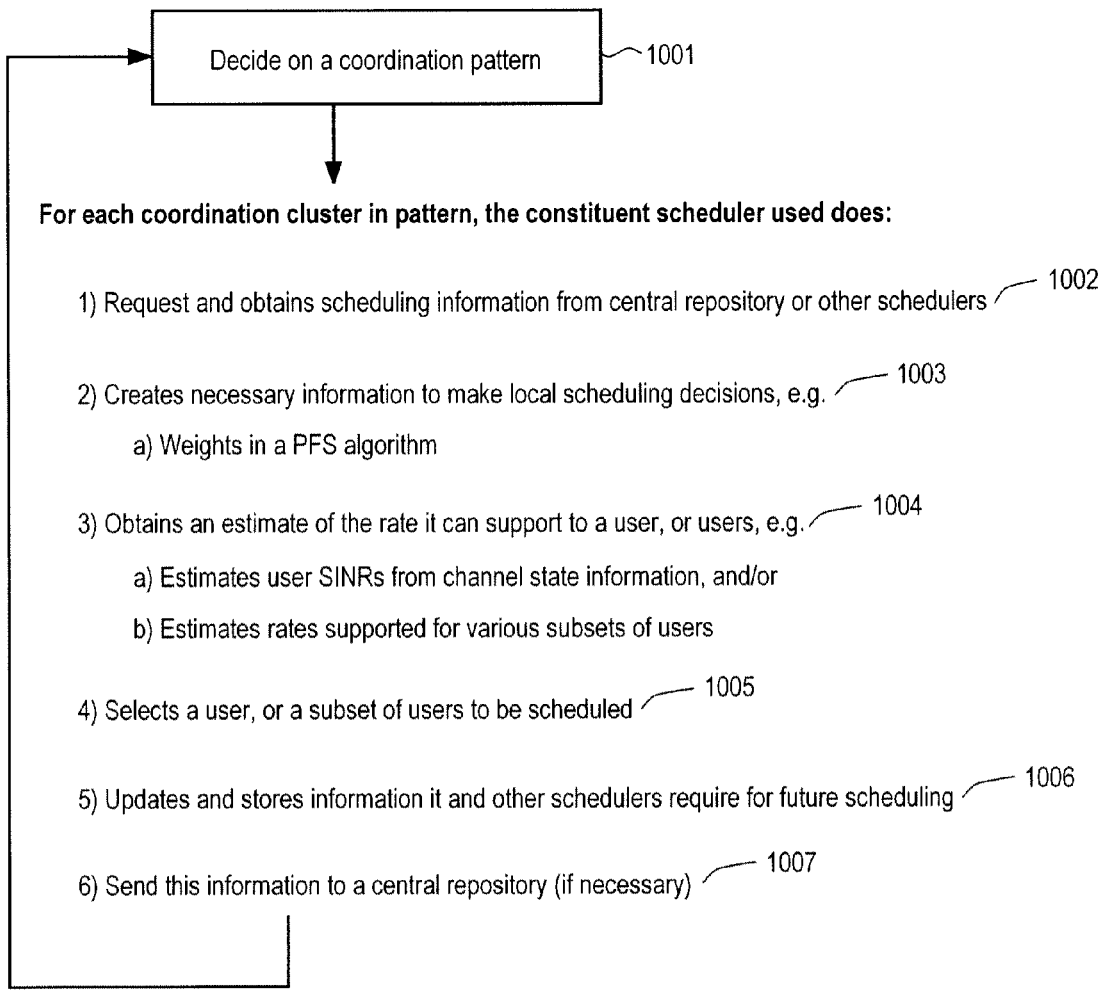
FIG. 10 is a flow diagram of another embodiment of a scheduling process.

In one embodiment, the communication system is as shown in FIG. 6, includes a single central entity and an additional entity referred to herein as a coordination controller. This is illustrated in FIG. 9. A flow diagram of another embodiment of a scheduling process used in such a system is shown in FIG. 10.

Referring to FIG. 9, the system includes coordination controller 901. Coordination controller 901 has access to the centrally collected scheduling information 902, which is stored in memory accessible via wired or wireless connections. If coordination controller 901 operates with schedulers that are PFS, then coordination controller 901 can also poll constituent entities directly for updates on such information (e.g. weights, rates scheduled in the past, etc.).

In one embodiment, controller 901 determines, given scheduling history, if it is advantageous to change the operation of the coordination patterns. For example, if it is noted that some user terminals are getting a higher rate than needed, and this happens when certain coordination patterns operate, while other users are not getting what they require, but are better served by other coordination patterns, the controller may decide to change the relative number of transmission opportunities or assigned transmission resources (e.g., time and/or frequency slots) assigned to various patterns. For example, if user6 and user7 have much higher rate requirements than user4 and user5, and user terminals such as user1 and user2 get the rate they need regardless of which pattern is used, then the controller may decide to use the pattern in FIG. 3 more than the pattern in FIG. 2. This could have advantages in cases where the number of patterns is limited, or where rate requirements are set externally, outside of the PFS, that are not possible with an equal or fixed sharing of patterns.

In one embodiment, controller 901 also decides to remove or add some coordination patterns into the system as required.

FIG. 10 is a flow diagram of one embodiment of a scheduling process. The process is performed by processing logic that may comprise hardware (circuitry, dedicated logic, etc.), software (such as is run on a general purpose computer system or a dedicated machine), or a combination of both. The scheduling process is performed by a scheduler.

Referring to FIG. 10, the process begins by processing logic decides on a coordination pattern (processing block 1001). After receiving information on which coordination pattern to use, for each coordination cluster in the pattern, processing logic in the scheduler requests and obtains information from a central repository or other schedulers (processing block 1002) and creates necessary information to make local scheduling decisions (processing block 1003). In one embodiment, the necessary information includes any such information that is able to specify the weights in a PFS algorithm.

Next, for each coordination cluster in the pattern, processing logic obtains an estimate of the rate it can support to a user terminal or terminals (processing block 1004). In one embodiment, the estimates include estimates of user terminal SINRs from channel state information. In another embodiment, the estimates include estimates of rates supported for various subsets of users. In yet another embodiment, the estimates include both the user terminal SINRs and the rates supported for the various subsets of users.

Then, for each coordination cluster in the pattern, processing logic selects a user terminal, or subset of user terminals to be scheduled (processing block 1005), updates and stores information it and other schedulers require for future scheduling (processing block 1006), and sends the information to a central repository, if necessary (processing block 1007). Thereafter, the process transitions to processing block 1001 and the process repeats.

Constituent Schedulers for Multiple Clusters

This embodiment shares principles of the previous embodiments. The difference is that a single entity is used to schedule over multiple clusters. An example of this is shown in FIG. 11.

Figure 11:
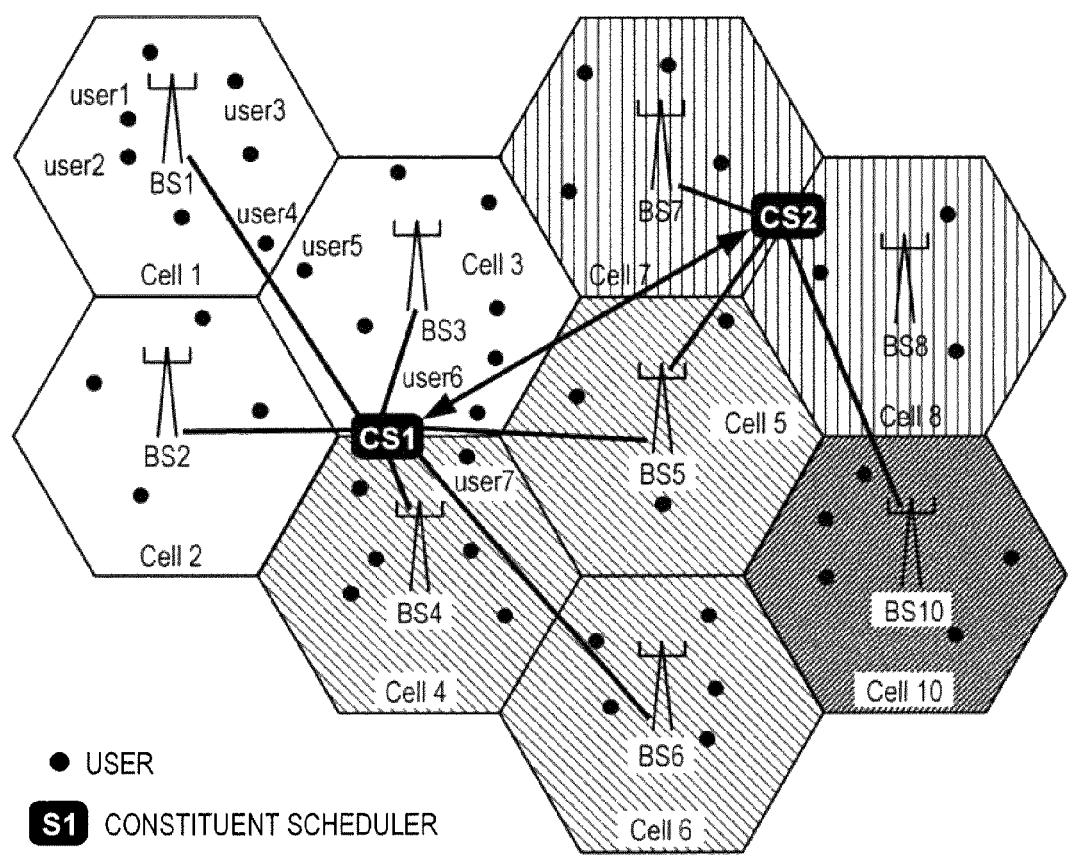
FIG. 11 is a block diagram of a communication system that uses scheduling entities that handle (operate over) multiple clusters.

Referring to FIG. 11, a single entity CS1 is used to schedule over two clusters taken from FIG. 2 at a given time (or frequency). In one embodiment, this scheduler also coordinates over another pattern, at a different time or in a different frequency band, for example the cluster represented by Cell 3+Cell 4+Cell 5 in FIG. 3. Therefore, it may be able to make concurrent joint decisions on user terminals common to both time or frequency intervals.

Also, in one embodiment, a scheduler such as CS1 makes concurrent joint decisions on scheduling users and scheduling which coordination patterns to user. In one embodiment, if FIG. 2 operates in one frequency band, and FIG. 3 in another, at the same time, it can consider the scheduling of user6 and user7 jointly.

In one embodiment, the scheduler CS1 decides to schedule in each band in a way such that a user terminal is not scheduled over both (or more than a given number of) bands simultaneously. In another embodiment, the scheduler CS1 decides to schedule over bands jointly which enable further cooperative signaling over coordination patterns in different frequencies. For example, in an OFDM system the signal may be split over multiple bands. However, in forming the signal one needs to know ahead of time the supported rates and how many bands are being used.

The interconnectivity represented in FIG. 11 also has implications to the amount of information that needs to be passed between these wider entities. In one embodiment, there may be only one entity. For example, the coordination controller in FIG. 9 only does the scheduling, in which case "S1", . . . , "S8" may be less complex entities.

Further Design Considerations

Physical Layer and Pattern Considerations in One Embodiment

In the above-described embodiments, the scheduling algorithm determines, based on information (e.g., channel state information), the rate that a user can be scheduled at a given point in time. The rates over all users are compared, and a subset of users are scheduled in line with the over all criterion (e.g., a weighted criterion). The embodiments do not necessarily depend on the physical layer. In a multi-cell system, the physical layer transmissions within each cluster of cells operate independently of other clusters. For purposes herein the transmitting signals themselves can use any technique it chooses, e.g. single-input single-output (SISO) transmission; multiple input multiple output (MIMO) transmission; and, multi-user MIMO (MU-MIMO) transmission whereby multiple antennas coordinate a joint concurrent transmission to multiple users. Underlying transmissions can be based on Orthogonal Frequency Division Multiplexing (OFDM), Code Division Multiple Access (CDMA), etc.

MU-MIMO is of particular interest in these multi-cell designs, and has nice properties for scheduling algorithms since constituent schedulers can in fact assume that interference within each cluster is controlled. By jointly coordinating transmissions over every cell within a cluster, using MU-MIMO as the underlying signaling, these can be significant benefit in alleviating problems due to interference. MU-MIMO transmission in the form of Linear Zero Forcing (LZF), Dirty Paper Coding (DPC), or Minimum Mean Square Error (MMSE) driven signaling, all have the advantage of controlling the effect of interference within each cluster. When MU-MIMO is used with PFS, one can look at various techniques to jointly select the user terminals and the MU-MIMO physical layer signaling solution.

With Linear Zero Forcing (LZF), one can consider a greedy scheduling algorithm which starts in step 1) by selecting only one user terminal in the cluster based on the assumption it is scheduled alone (in which case the LZF solution is trivial), then searches for the best combination of 2 users, limiting the search such that the user in step 1) is one of the users (the LZF solution changes with 2 users), and so on until a maximum number of user terminals is selected (the LZF solution changes with each additional user terminal).

In one embodiment, the selection of user terminals at each step would look at individual and sum weighted rates $w_j(k)$ $Z_j(k)$ and sum over potential users $w_j(k)Z_j(k)$ in making decisions.

Physical Layer and Pattern Considerations in Another Embodiment

In one embodiment, the scheduling algorithm includes in the rate terms $Z_j(k)$ provision for interference coming from outside of the cluster.

In one embodiment, in FIG. 2, one could provide estimates of average interference levels seen by different users. This information can be estimated by the users themselves, by sensing transmission levels they see from stations which do not serve them. Such information can be implicit on a user's geographic locations. In one embodiment, such an estimate is derived based on geographic considerations and assumed powers radiating from antennas from other cluster(s). For example, user6 would probably be given a different (higher) estimated (whether sensed or determined by location) interference than users1, 2, 3, and 4 for this coordination pattern Furthermore, since users are members of different clusters at different times, in one embodiment, they in fact also have partial information useful in helping to give estimated interferences. For example, in FIG. 2, user6 is not being served by transmissions from base stations BS4 or BS5. However, when the system is operating as in FIG. 3, it does have information on the channel between itself and BS4 and BS5. In one embodiment this information is used in determining the interference under the operation of FIG. 2. This would for example assume that, under FIG. 2, BS4 and BS5 are radiating about the same power/signal as it did under FIG. 3.

Other Physical Layer and Pattern Considerations

The embodiments of the joint scheduling and coordination pattern variation can use the concepts described in other pattern varying schemes such as those in which, power levels applied to different frequency bands over the clusters over the coordination patterns can be chosen in a way which helps the scheduling. See U.S. patent application Ser. No. 12/538,739, filed Aug. 10, 2009, titled "A Method for Varying Transmit Power Patterns in a Multi-Cell Environment".

Objectives with Respect to Coordination Patterns and the Users they Serve

User terminals such as user1 and user2 in FIG. 2 may overwhelm other user terminals, since the rates they may be able to be served with are good irrespective of the coordination pattern used. As a result, it is possible that the scheduler, unless it reacts to this imbalance, may not serve users such as user4, user5, user6, or user7 sufficiently. This is true even when using algorithms such as PFS.

As an extension to embodiments, and particularly as an extension to some of the concepts in described above, one can consider schedulers which further limit the subset of user terminals being scheduled at each constituent scheduler, or within each coordinated cluster, in a purposeful fashion. In one embodiment this can, for example, be done as a function of frequency band depending on either the user's geographic location or a user's estimated rate. For example, in FIG. 2, a scheduler reserves some bands for user terminals such as user4 and user5, prohibiting user terminals such as user1 and user2 from being scheduled in such bands.

In one embodiment, one purposefully changes the weighting in the scheduling algorithm to accomplish this. Restricting a user terminal is equivalent to setting its weight $w(k)$ to zero. In one embodiment, discouraging the scheduling of a user terminal is accomplished by reducing $w(k)$ further (e.g., scaling $w(k)$ and using a new value $p(k)w(k)$, where $0 \leq p(k) \leq 1.0$). This scaling can be used when scheduling in a given band or a given coordination patterns, and would override some of the default operation of a PFS.

Advantages of Embodiments of the Invention

Embodiments of the invention include a joint user+rate+pattern scheduling algorithm within a multi-cell environment for which the coordination pattern between cells vary. Furthermore, the scheduling itself can determine the scheduling of coordination patterns.

Embodiments of the invention have one or more of the following advantages. The joint operation allows the scheduling algorithm, which is made of many smaller "constituent" scheduling algorithms operating in a joint fashion, to make better decisions about which user terminals to schedule and when. By allowing the scheduling algorithm effectively link all possibilities (all possible scheduling opportunities) over all coordination patterns (all possible antenna-user pairs over all transmission resources), user terminals can be scheduled when it is best with respect to all such possibilities. This has advantages in terms of the total rate served to user terminals, with respect to fairness between users, with respect to individual rates user terminals see, and with respect to latency of serving user terminals. The joint operation also allows the scheduling algorithm to influence the operation of the variation of coordination patterns. The scheduling algorithm may in fact also direct this operation, making a fully joint decision not only over all constituent schedulers, but over the scheduling of patterns themselves.

An Example of a Scheduler

Figure 12:
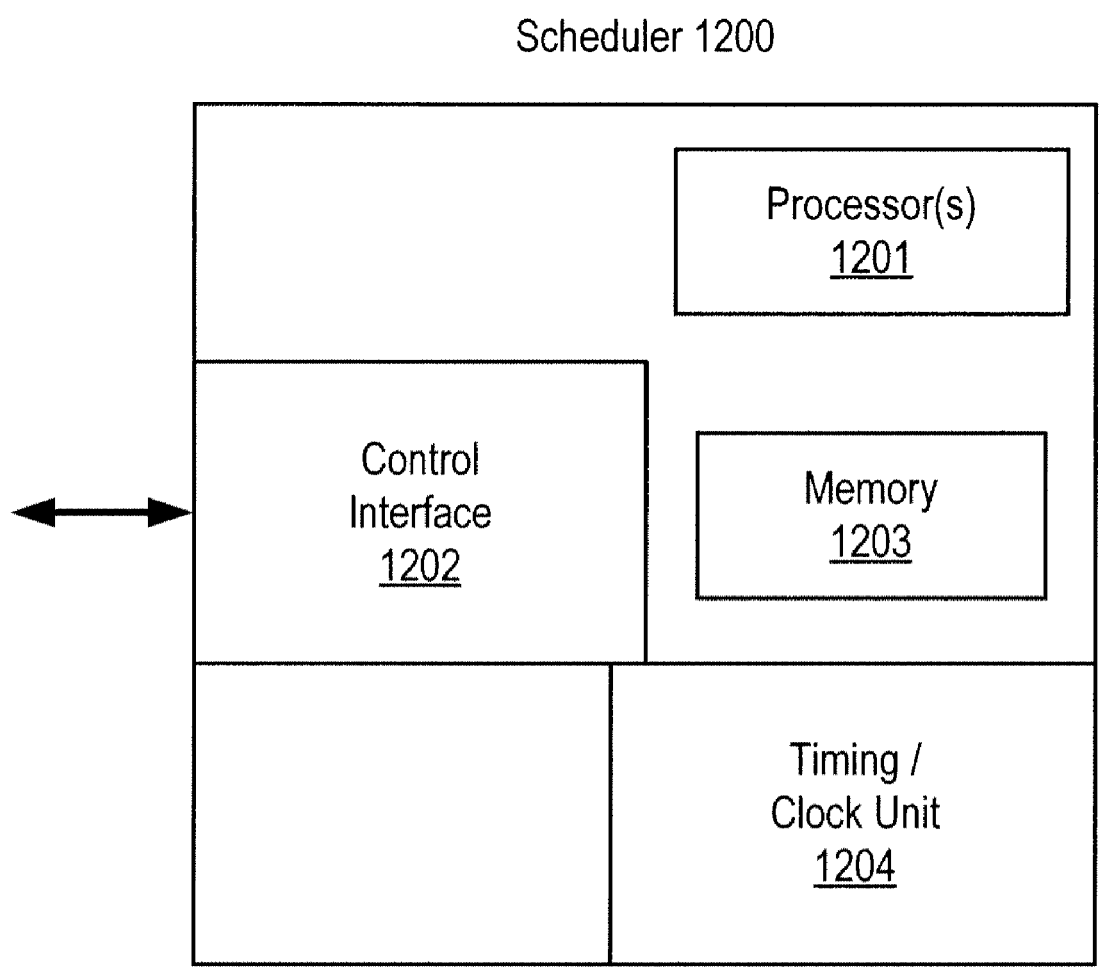
FIG. 12 is a block diagram of one embodiment of a controller as described herein.

FIG. 12 is a block diagram of one embodiment of a scheduler that performs one or more of the functions described above, including performing a scheduling algorithm for a cluster or for multiple clusters. In one embodiment, schedulers are located within base stations. In another embodiment, the scheduler is separate from base stations.

Referring to FIG. 12, the scheduler 1200 includes a a control interface 1202 to send and receive control information. It can use this interface to send information to control base stations, such as, for example, information specifying which user terminal to schedule in which cluster and on which transmission resource, as well as transmission rates for the user terminals. It can also use this information to receive information required to make its scheduling decisions, such as user weights "$w_j$", user average or sum rates from other schedulers and or a central repository, user channel state information, user estimated SINRs, etc. The control interface 1202 may interface with one base station or multiple base stations and may comprises wired or wireless communication functionality.

Processor(s) 1201 executes one or more scheduling algorithms, such as those described above, to control, or cause to be controlled, many of a base station's operations (or operations of other base stations). This would include selecting user sets such as $\Omega$ given the scheduling criterion and information received from to control interface 1202. User rates are also determined by this unit. It can make decisions on what coordination pattern to use. Memory 1203 stores instructions and other data, along with pre-defined coordination patterns and scheduling algorithm(s), such as those described above. A timing/clock unit 1204 provides timing and/or clocking for the base station, in a manner well-known in the art.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A wireless communication system comprising:
   a plurality of user terminals;
   a plurality of antennas to communicate with the plurality of user terminals, wherein the plurality of antennas are grouped into coordination patterns that specify which antennas operate together as a cluster to coordinate transmissions with a subset of the plurality of user terminals, and further wherein the defined pairs of the antenna sets and associated user sets vary over transmission resources based on coordination pattern changes such that different sets of antennas in the plurality of antennas are grouped together at different times to coordinate transmissions to different subsets of users; and
   at least one controller to execute at least one scheduling algorithm to schedule transmission with user terminals by specifying which user terminal to schedule for service by which set of antennas and on which transmission resource and with what transmission rate.

2. The wireless communication system defined in claim 1 wherein which user terminals are scheduled and the rates to user terminals are scheduled jointly over the coordination patterns.

3. The wireless communication system defined in claim 1 wherein which user terminals are scheduled, the rates to user terminals, and the coordination pattern used are scheduled jointly.

4. The wireless communication system defined in claim 1 wherein the antennas are located at one or more base-stations.

5. The wireless communication system defined in claim 1 wherein clusters of antennas and the users each cluster serve, as defined by the coordination pattern, vary over transmission resources defined in part based on time.

6. The wireless communication system defined in claim 1 wherein clusters of antennas and the users each cluster serve, as defined by the coordination pattern, vary over transmission slots defined in part based on frequency.

7. The wireless communication system defined in claim 1 wherein a rate for at least one user terminal is based on average rates the one user terminal determined in part from rates given to that user over all possible clusters of antennas over all possible transmission resources.

8. The wireless communication system defined in claim 7 wherein the at least one controller is operable to receive information indicative of the average rate for user terminals to which they provide rates.

9. The wireless communication system defined in claim 1 wherein one controller attempts to maximize a sum of weighted average rates of a set of user terminals to be served.

10. The wireless communication system defined in claim 9 wherein weights used to generate the weighted average rates are selected to give each user terminal in the set of user terminals a determined share of the rate available from the controller.

11. The wireless communication system defined in claim 9 wherein weights used to generate the weighted average rates are based on an estimate of the rate a user terminal has received up to a specified scheduling event.

12. The wireless communication system defined in claim 1 wherein the average rate is determined over a number of coordination patterns by a windowed average of rates that have been given to a user terminal over a given interval time by clusters of antennas in the patterns.

13. The wireless communication system defined in claim 1 wherein the at least one controller comprises a plurality of controllers and controllers in the plurality of controllers exchange information with each other to indicate what rate was given to user terminals in the specified periods of time.

14. The wireless communication system defined in claim 13 wherein all controllers in the plurality of controllers that provide a user terminal with a transmission rate exchange with each other rate information indicative of the rate an individual controller provided the user terminal.

15. The wireless communication system defined in claim 13 wherein at least one of the controllers in the plurality of controllers broadcasts the average rate of one of the user terminals to other controllers based on one of more of its own rate information and exchanged rate information which are indicative of rates provided the one user terminal by clusters of antennas in the plurality of clusters of antennas.

16. The wireless communication system defined in claim 1 wherein the at least one controller comprises a plurality of controllers and at least one of the plurality of controllers is part of one of the plurality of base stations.

17. A method comprising:
    varying clusters of antennas into new coordination patterns that specify which antennas operate together as a cluster to coordinate transmissions with a subset of the plurality of user terminals, wherein clusters vary over transmission resources based on coordination pattern changes such that different sets of antennas in the plurality of antennas are grouped together at different times to coordinate transmissions to different subsets of users; and
    executing at least one scheduling algorithm to schedule transmissions with user terminals by specifying which user terminal to schedule in which cluster and on which transmission resource and transmission rates for the user terminals.

18. The method defined in claim 17 wherein executing at least one scheduling algorithm comprises, for each coordination cluster specified in a coordination pattern,
    receiving information to implement a scheduling criterion;
    creating information to make a scheduling decision;
    obtaining an estimate of a rate the system using the set of antennas can support to a user terminal;
    selecting the user terminal for scheduling based on the rate estimate;
    determining the rate a user is to be given if it is scheduled.

19. A method for scheduling user terminals in a wireless communication system having a plurality of user terminals and a plurality of antennas that are grouped based on coordination patterns that specify which antennas operate together as a cluster to coordinate transmissions with a subset of the plurality of user terminals, the method comprising:
    for each coordination cluster specified in a coordination pattern, performing operations including
    receiving information required to implement a scheduling criterion;
    creating information to make a scheduling decision;
    obtaining an estimate of a rate the system using the set of antennas can support to a user terminal;
    selecting the user terminal for scheduling based on the rate estimate;
    determining the rate a user is to be given if it is scheduled.

20. The method defined in claim 19 further comprising obtaining information on which coordination pattern to use.

21. The method defined in claim 19 further comprising determining which coordination pattern to use.

22. The method defined in claim 19 wherein the estimate of a rate a group of antennas can support to a user terminal, as determined by a scheduler, is based on one selected from a group consisting of an estimate of the effective Signal to Interference and Noise Ratios (SINRs) of user terminals derived from channel state information, the channel state information between a user and associated serving antennas, and an estimate of rates supported to each user if transmissions are sent jointly to each in a plurality of subsets of users.

23. The method defined in claim 19 further comprising updating and storing information required for future scheduling decisions regarding the user terminal.

24. The method defined in claim 23 further comprising sending the information to a central repository.

25. The method defined in claim 17 where the antennas are at least located at or controlled by a plurality of base-stations.

26. The method defined in claim 19 where the antennas are located at and/or controlled by a plurality of base-stations.

* * * * *